US008567697B2

(12) United States Patent
Bredberg

(10) Patent No.: US 8,567,697 B2
(45) **Date of Patent: *Oct. 29, 2013**

(54) LAWN SPRINKLER

(71) Applicant: Anthony J. Bredberg, Gig Harbor, WA (US)

(72) Inventor: Anthony J. Bredberg, Gig Harbor, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/672,240

(22) Filed: Nov. 8, 2012

(65) Prior Publication Data

US 2013/0062428 A1 Mar. 14, 2013

Related U.S. Application Data

(62) Division of application No. 13/195,630, filed on Aug. 1, 2011, now Pat. No. 8,328,117, which is a division of application No. 12/260,959, filed on Oct. 29, 2008, now Pat. No. 7,988,071.

(60) Provisional application No. 60/983,857, filed on Oct. 30, 2007.

(51) Int. Cl.

| | |
|---|---|
| ***A01G 25/06*** | (2006.01) |
| ***B05B 15/06*** | (2006.01) |
| ***B05B 3/00*** | (2006.01) |
| ***B05B 3/04*** | (2006.01) |
| ***B05B 15/10*** | (2006.01) |

(52) U.S. Cl.
USPC ........... 239/206; 239/201; 239/204; 239/210; 239/237; 239/240

(58) Field of Classification Search
USPC ......... 239/201, 204, 205, 206, 210, 237, 240, 239/242
See application file for complete search history.

(56) References Cited

U.S. PATENT DOCUMENTS

| | | | | |
|---|---|---|---|---|
| 129,125 | A | 7/1872 | Gibson | |
| 820,789 | A | 5/1906 | Hutchins | |
| 879,892 | A | 2/1908 | Packard | |
| 1,181,145 | A | 5/1916 | Larson | |
| 1,308,613 | A | 7/1919 | Anderson | |
| 1,335,267 | A | 3/1920 | Ambrose | |
| 1,400,533 | A | 12/1921 | Engel | |
| 1,492,878 | A | 5/1924 | Eklundh | |
| 1,593,918 | A | 7/1926 | Stanton | |
| 1,618,538 | A | 2/1927 | Kittinger | |
| 1,756,483 | A | 4/1930 | Estep | |
| 1,766,514 | A | 6/1930 | Henry | |
| 1,806,100 | A * | 5/1931 | Thompson | 239/231 |
| 1,853,805 | A | 4/1932 | Elder | |
| 1,881,409 | A | 10/1932 | Le Moon | |
| 1,938,838 | A | 12/1933 | Jacobson | |
| 1,964,225 | A | 6/1934 | Sumner | |
| 1,968,396 | A | 7/1934 | Hollingworth | |
| 2,002,178 | A | 5/1935 | Henry | |
| 2,009,478 | A | 7/1935 | Coles et al. | |
| 2,032,064 | A | 2/1936 | Meng | |
| 2,047,348 | A | 7/1936 | Wilson | |
| 2,090,284 | A | 8/1937 | Carlson | |

(Continued)

*Primary Examiner* — Ryan Reis
(74) *Attorney, Agent, or Firm* — R. Reams Goodloe, Jr.

(57) ABSTRACT

A flow regulator for use with a lawn sprinkler. The apparatus includes an impeller, a regulator portion and a nozzle regulator portion. The sprinkler is configured to regulate the delivery of water according to the shape of the area to be irrigated, so that water is not wasted on adjacent areas which do not require irrigation.

10 Claims, 13 Drawing Sheets

(56) References Cited

U.S. PATENT DOCUMENTS

| | | | |
|---|---|---|---|
| 2,221,878 | A | 11/1940 | Nelson |
| 2,305,210 | A | 12/1942 | Wahlin |
| 2,393,091 | A | 1/1946 | Lacy-Mulhall |
| 2,414,052 | A | 1/1947 | Martin |
| 2,560,662 | A | 1/1951 | Rieger |
| 2,571,763 | A | 10/1951 | Robbins |
| 2,595,114 | A | 4/1952 | Wiseltier |
| 2,600,987 | A | 6/1952 | Gallice |
| 2,601,559 | A | 6/1952 | Riblet |
| 2,619,388 | A | 11/1952 | Wahlin |
| 2,634,163 | A | 4/1953 | Double |
| 2,654,635 | A | 10/1953 | Lazzarini |
| 2,723,157 | A | 11/1955 | Thompson |
| 2,729,295 | A | 1/1956 | Edwards |
| 2,739,839 | A | 3/1956 | Greener et al. |
| 2,756,099 | A | 7/1956 | Reynolds, Jr. |
| 2,808,732 | A | 10/1957 | Champion, Sr. |
| 2,814,526 | A | 11/1957 | Blair |
| 2,895,681 | A | 7/1959 | Kachergis |
| 2,902,888 | A | 9/1959 | Powischill et al. |
| 2,909,325 | A | 10/1959 | Hunter |
| 2,999,643 | A | 9/1961 | Kennedy |
| 3,026,044 | A | 3/1962 | Kennedy |
| 3,035,777 | A | 5/1962 | Bodell et al. |
| 3,035,778 | A | 5/1962 | Kimbro et al. |
| 3,090,563 | A | 5/1963 | Cheeseboro |
| 3,095,148 | A | 6/1963 | Smith |
| 3,104,818 | A | 9/1963 | Ballard et al. |
| 3,107,056 | A | 10/1963 | Hunter |
| 3,111,268 | A | 11/1963 | Butler |
| 3,116,651 | A | 1/1964 | Hardy |
| 3,131,867 | A | 5/1964 | Miller et al. |
| 3,139,901 | A | 7/1964 | Camp |
| 3,141,909 | A | 7/1964 | Mayo, Jr. |
| 3,272,437 | A | 9/1966 | Coson |
| 3,321,138 | A | 5/1967 | Curry |
| 3,383,047 | A | 5/1968 | Hauser |
| 3,391,868 | A | 7/1968 | Cooney |
| 3,398,894 | A | 8/1968 | D'Agaro |
| 3,424,381 | A | 1/1969 | Best |
| 3,428,256 | A | 2/1969 | Painter |
| 3,451,623 | A | 6/1969 | Dibrell |
| 3,452,930 | A | 7/1969 | Karbo |
| 3,464,628 | A | 9/1969 | Chow |
| 3,515,351 | A | 6/1970 | Costa |
| 3,528,093 | A | 9/1970 | Eerkens |
| 3,574,336 | A | 4/1971 | Epple |
| 3,578,248 | A | 5/1971 | Congdon |
| 3,580,506 | A | 5/1971 | Costa |
| 3,580,514 | A | 5/1971 | Radecki |
| 3,583,638 | A | 6/1971 | Eby |
| 3,625,429 | A | 12/1971 | Turrell |
| 3,645,451 | A | 2/1972 | Hauser |
| 3,648,928 | A | 3/1972 | Lindgren |
| 3,654,817 | A | 4/1972 | Kane |
| 3,703,993 | A | 11/1972 | Schreiner |
| 3,724,757 | A | 4/1973 | Hunter |
| 3,727,842 | A | 4/1973 | Ertsgaard et al. |
| 3,791,581 | A | 2/1974 | Chow |
| 3,791,585 | A | 2/1974 | Warren |
| 3,794,245 | A | 2/1974 | Wilson |
| 3,854,664 | A | 12/1974 | Hunter |
| 3,871,582 | A | 3/1975 | Biddle |
| 3,878,990 | A | 4/1975 | Geraudie |
| 3,884,416 | A | 5/1975 | King |
| 3,915,383 | A | 10/1975 | King |
| 3,921,191 | A | 11/1975 | Merrin |
| 3,921,910 | A | 11/1975 | Hayes et al. |
| 3,924,809 | A | 12/1975 | Troup |
| 3,952,954 | A | 4/1976 | Taylor |
| 3,960,327 | A | 6/1976 | Olson |
| 3,977,063 | A | 8/1976 | Bruninga |
| 4,002,295 | A | 1/1977 | Drori |
| 4,004,612 | A | 1/1977 | Hummel, Jr. et al. |
| 4,019,686 | A | 4/1977 | Palma |
| 4,026,471 | A | 5/1977 | Hunter |
| 4,055,205 | A | 10/1977 | Withoff et al. |
| 4,113,181 | A | 9/1978 | Sheets |
| 4,119,275 | A | 10/1978 | Hunter |
| 4,186,880 | A | 2/1980 | Jacobi et al. |
| 4,189,099 | A | 2/1980 | Bruninga |
| 4,198,000 | A | 4/1980 | Hunter |
| 4,198,001 | A | 4/1980 | Rodriguez |
| 4,201,334 | A | 5/1980 | Janik |
| 4,201,344 | A * | 5/1980 | Lichte ........................... 239/242 |
| 4,220,283 | A | 9/1980 | Citron |
| 4,245,786 | A | 1/1981 | Abrahamsen et al. |
| 4,253,608 | A | 3/1981 | Hunter |
| 4,265,403 | A | 5/1981 | Bonetti |
| 4,269,354 | A | 5/1981 | DeWitt |
| 4,272,024 | A | 6/1981 | Kah, Jr. |
| 4,277,029 | A | 7/1981 | Rabitsch |
| 4,281,793 | A | 8/1981 | DeWitt |
| 4,316,579 | A | 2/1982 | Ray et al. |
| 4,353,506 | A | 10/1982 | Hayes |
| 4,398,666 | A | 8/1983 | Hunter |
| 4,399,999 | A | 8/1983 | Wold |
| 4,417,691 | A | 11/1983 | Lockwood |
| 4,429,832 | A | 2/1984 | Sheets |
| 4,453,673 | A | 6/1984 | Icenbice |
| 4,462,545 | A | 7/1984 | Lourenco |
| 4,471,907 | A | 9/1984 | Gerstmann |
| 4,471,908 | A | 9/1984 | Hunter |
| 4,474,328 | A | 10/1984 | Hale |
| 4,496,104 | A | 1/1985 | Ducasse |
| 4,501,391 | A | 2/1985 | Hunter |
| 4,538,762 | A | 9/1985 | Lemkin |
| 4,540,125 | A | 9/1985 | Gorney et al. |
| 4,568,024 | A | 2/1986 | Hunter |
| 4,613,077 | A | 9/1986 | Aronson |
| 4,624,412 | A | 11/1986 | Hunter |
| 4,625,914 | A | 12/1986 | Sexton et al. |
| 4,637,549 | A | 1/1987 | Schwartzman |
| 4,646,224 | A | 2/1987 | Ransburg et al. |
| 4,648,558 | A | 3/1987 | Rabitsch |
| 4,681,259 | A | 7/1987 | Troup |
| 4,681,260 | A | 7/1987 | Cochran |
| 4,718,605 | A | 1/1988 | Hunter |
| 4,739,934 | A | 4/1988 | Gewelber |
| 4,739,997 | A | 4/1988 | Smetana |
| 4,763,838 | A | 8/1988 | Holcomb |
| 4,766,709 | A | 8/1988 | Galbraith |
| 4,773,595 | A | 9/1988 | Livne |
| 4,781,327 | A | 11/1988 | Lawson et al. |
| 4,796,809 | A | 1/1989 | Hunter |
| 4,796,811 | A | 1/1989 | Davisson |
| 4,819,875 | A | 4/1989 | Beal |
| 4,834,289 | A | 5/1989 | Hunter |
| 4,836,449 | A | 6/1989 | Hunter |
| 4,836,450 | A | 6/1989 | Hunter |
| 4,836,458 | A | 6/1989 | Cavagna |
| 4,867,379 | A | 9/1989 | Hunter |
| 4,892,252 | A | 1/1990 | Bruninga |
| 4,907,742 | A | 3/1990 | Whitehead et al. |
| 4,913,351 | A | 4/1990 | Costa |
| 4,961,534 | A | 10/1990 | Tyler et al. |
| 4,984,740 | A | 1/1991 | Hodge |
| 5,009,368 | A | 4/1991 | Streck et al. |
| 5,031,840 | A | 7/1991 | Grundy et al. |
| 5,039,013 | A | 8/1991 | Sawade et al. |
| 5,056,699 | A | 10/1991 | Newbold et al. |
| 5,058,806 | A | 10/1991 | Rupar |
| RE33,823 | E | 2/1992 | Nelson et al. |
| 5,123,597 | A | 6/1992 | Bendall |
| 5,154,348 | A | 10/1992 | Ratnik et al. |
| 5,248,093 | A | 9/1993 | Pleasants |
| 5,248,095 | A | 9/1993 | Rankin et al. |
| 5,267,689 | A | 12/1993 | Forer |
| 5,280,854 | A | 1/1994 | Das |
| 5,297,607 | A | 3/1994 | Beauchamp |
| 5,328,178 | A | 7/1994 | Nies |
| 5,333,785 | A | 8/1994 | Dodds et al. |
| 5,366,157 | A | 11/1994 | Pleasants |
| 5,370,311 | A | 12/1994 | Chen |

(56) References Cited

U.S. PATENT DOCUMENTS

| | | | |
|---|---|---|---|
| 5,375,768 | A | 12/1994 | Clark |
| 5,423,486 | A | 6/1995 | Hunter |
| 5,598,977 | A | 2/1997 | Lemme |
| 5,636,793 | A | 6/1997 | Gurevitch |
| 5,647,541 | A | 7/1997 | Nelson |
| 5,710,887 | A | 1/1998 | Chelliah et al. |
| 5,711,486 | A | 1/1998 | Clark et al. |
| 5,774,870 | A | 6/1998 | Storey |
| 5,845,849 | A | 12/1998 | Mitzlaff |
| 6,079,637 | A | 6/2000 | Ohayon |
| 6,158,675 | A | 12/2000 | Ogi |
| 6,241,158 | B1 | 6/2001 | Clark et al. |
| 6,332,581 | B1 | 12/2001 | Chin et al. |
| 6,402,048 | B1 | 6/2002 | Collins |
| 6,491,235 | B1 | 12/2002 | Scott et al. |
| 6,494,385 | B1 | 12/2002 | Chen |
| 6,651,905 | B2 | 11/2003 | Sesser et al. |
| 6,688,539 | B2 | 2/2004 | Vander Griend |
| 6,695,223 | B2 | 2/2004 | Beutler et al. |
| 6,732,950 | B2 | 5/2004 | Ingham, Jr. et al. |
| 6,732,952 | B2 | 5/2004 | Kah, Jr. |
| 6,736,332 | B2 | 5/2004 | Sesser et al. |
| 6,814,304 | B2 | 11/2004 | Onofrio |
| 6,817,543 | B2 | 11/2004 | Clark |
| 6,827,291 | B2 | 12/2004 | Townsend |
| 6,834,814 | B1 | 12/2004 | Beckman |
| 6,834,816 | B2 | 12/2004 | Kah, Jr. |
| 6,837,448 | B2 | 1/2005 | Han et al. |
| 6,921,029 | B2 | 7/2005 | Lockwood |
| 7,090,146 | B1 | 8/2006 | Ericksen et al. |
| 7,631,813 | B1 | 12/2009 | Lichte et al. |
| 7,828,230 | B1 | 11/2010 | Anuskiewicz et al. |
| 8,074,897 | B2 | 12/2011 | Hunnicutt et al. |
| 2005/0194465 | A1 | 9/2005 | Wang |

* cited by examiner

LAWN SPRINKLER

RELATED PATENT APPLICATIONS

This application is a divisional of prior and now pending U.S. patent application Ser. No. 13/195,630 filed Aug. 1, 2011, which application claimed priority under 35 USC Sec 121 and was a divisional of prior U.S. patent application Ser. No. 12/260,959 filed Oct. 29, 2008 (now U.S. Pat. No. 7,988, 071 B2, issued Aug. 2, 2011), which application claimed priority from prior U.S. Provisional Patent Application Ser. No. 60/983,857, filed Oct. 30, 2007, entitled LAWN SPRINKLER, the disclosures of each of which are incorporated herein in their entirety, including the specification, drawing, and claims, by this reference.

TECHNICAL FIELD

This invention relates to lawn sprinklers, and more particularly, to lawn sprinklers of the pop-up type adapted for use in watering a selected water receiving area.

BACKGROUND

Water sprinklers of various designs have been utilized for many years. However, many of the currently utilized designs water over a circular area that is of uniform diameter. A few designs have the ability to water over a selected arcuate shaped receiving area. However, significant amounts of water are wasted due to the inability of the general public to obtain and install lawn sprinklers that are capable of being provided for, or which are adjustable to, watering only in a specific and often irregularly shaped area where watering is needed, rather than applying a water stream relatively indiscriminately over an area that may include features where water is not required, such as driveways or sidewalks.

Since water is increasingly scarce and/or increasingly costly in many locales (whether as a result of increased fees from the utility provider, or as a result of energy costs for pumping, or otherwise) there remains a need for a law sprinkler apparatus that can reliably provide the needed water over the required area, while minimizing or eliminating the application of water to adjacent areas which do not require the application of water.

Thus, there remains an unmet need for an improved lawn sprinkler with suitable features that would direct available water to those areas needing water, while avoiding application of water to those areas which do not require such watering.

SUMMARY

I have now developed a lawn sprinkler with flow restricting passageways that enable water projected from the lawn sprinkler to be varied for application according to a predefined pattern, so that the volume of water applied to a particular portion of lawn remains relatively uniform although the water is applied over an area having a non-circular shape or irregular geometric pattern.

In one embodiment, a lawn sprinkler apparatus is provided for regulating the flow of water to be applied to a non-circular or irregularly shaped area, while providing substantially uniform quantities of water per unit area of the lawn. The sprinkler apparatus includes a base configured to confiningly receive a pressurized water flow, and a sprinkler nozzle assembly coupled to the base for rotating movement with respect to the base. The sprinkler nozzle assembly is responsive to the pressurized water flow to pop-up into an operating position for discharge of water from a nozzle; A drive mechanism is coupled to the sprinkler nozzle assembly. The drive mechanism includes a water driven impeller and a gear train adapted for operatively driving the sprinkler nozzle assembly in arcuate movement.

A water flow regulator is provided to regulate the water flow outward from the nozzle in a predetermined pattern consistent with the size and shape of the area to be watered. The water flow regulator is configured for regulating a first portion of a water flow to increase water flow rate of the first portion of the water flow over a first unit of time, and for regulating the first portion of a water flow to decrease the water flow rate of the first portion of the water flow over a second unit of time. In one embodiment, increased water flow of the first portion of water through an impeller increases the rotational speed of the sprinkler, when the sprinkler rotates through angular positions with respect to a lawn pattern where less water is required along the then current radial direction, with respect to a receiving lawn pattern. In this manner, less water is placed on positions requiring less water along a particular radial, so that in spite of irregular or varying radial lengths of water application, a substantially uniform amount of water is placed on each area of a lawn, even though a given radial length from the sprinkler to the then current edge of the lawn varies, as the angular position of the water stream from the sprinkler varies with respect to the lawn. Decreased flow of the first portion of water through an impeller decreases the rotational speed of the sprinkler nozzle assembly, allowing more water to be provided to a portion of the lawn. Consistent with the regulation of the first portion of water that is directed to the impeller and used for increasing and decreasing rotational speed of the sprinkler, the water flow regulator is also configured for regulating a second portion of a water flow. The second flow of water bypasses the impeller and is routed to the nozzle in order to decrease the water flow rate or increase the water flow rate of the stream of water exiting the nozzle and which is delivered to the lawn. Thus, the second portion of the water flow is decreased over a first unit of time and is increased over the second unit of time, when the rotational speed of the sprinkler is decreased but the volume of water exiting the nozzle needs to be increased, for application along a longer radius.

A water outlet nozzle is provided that is sized and shaped (a) to decrease the radial length of water distribution along a first vector over the first unit of time in response to the increase in water flow rate of the first portion of the water flow, and (b) to increase the radial length of water distribution along a second vector over a second unit of time in response to a decrease in water flow rate of the first portion of the water flow. The drive mechanism is operative to increase the arcuate speed of the sprinkler nozzle assembly over the first unit of time in response to the increase in water flow rate of the first portion of the water flow, and to decrease the arcuate speed of the sprinkler nozzle assembly over the second unit of time in response to the decrease in water flow rate of the first portion of the water flow.

In one embodiment, the water flow regulator includes an impeller regulator and a nozzle regulator, wherein during the first unit of time, the impeller regulator is configured to operatively increase fluid flow through the impeller, to increase rotational speed of the sprinkler nozzle assembly, and at the same time, the nozzle regulator is configured to operatively decrease water flow through the nozzle. Similarly, during a second unit of time, the impeller regulator is configured to operatively decrease the water flow through the impeller, and the nozzle regulator is configured to operatively increase water flow through the nozzle. In one embodiment, the impeller regulator is provided in part by an inner portion of a first perforated disk, wherein the inner portion having apertures therethrough defined by first perforated disk inner aperture sidewalls. In such an embodiment, the impeller regulator is further provided by an inner portion of a second perforated disk, wherein the inner portion of the second perforated disk has apertures therethrough defined by second perforated disk inner aperture sidewalls. In such an embodiment, the nozzle regulator is provided by an outer portion of the first perforated disc, wherein the outer portion has apertures therethrough defined by first perforated disk outer aperture sidewalls. Further, the nozzle regulator is also provided in part by an outer portion of a second perforated disc, wherein the outer portion has apertures therethrough defined by second perforated disk outer aperture sidewalls. The second perforated disk is located and configured for relative movement with respect to said first perforated disk so that the passageways provided by the first perforated disk inner portion apertures and the passageways provided by the second perforated disk inner portion apertures cooperatively provide the increasing and decreasing water flow first fluid flow during movement of the second perforated disk relative to the first perforated disk, to provide the impeller regulator. Likewise, the second perforated disk is located and configured for relative movement with respect to the first perforated disk so that passageways provided by the first perforated disk outer portion apertures and passageways provided by the second perforated disk outer portion apertures cooperatively provide the increasing and decreasing water flow first fluid flow during movement of the second perforated disk relative to the first perforated disk, to provide the nozzle regulator.

The foregoing briefly describes a lawn sprinkler apparatus having flow restrictors for regulating the flow of water to provide a substantially uniform quantity of water per unit area of lawn, even in non-circular or irregular geometric shapes. The invention will be more readily understood upon consideration of the following detailed description, taken in conjunction with careful examination of the accompanying figures of the drawing.

BRIEF DESCRIPTION OF DRAWINGS

In order to enable the reader to attain a more complete appreciation of the invention, and of the novel features and advantages thereof, attention is directed to the following detailed description when considered in connection with the accompanying drawings, wherein.

Figure 1:
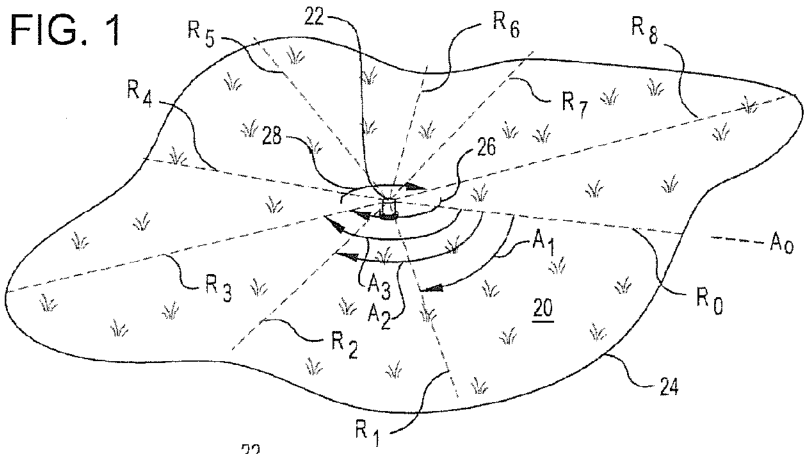
FIG. 1 provides a perspective view of an irregular shaped lawn area that is to be watered, preferably with a relatively uniform volume of water per square foot of lawn wherever located, via a rotating sprinkler that provides water substantially along vectors of differing radial lengths from the sprinkler.

In the various figures of the drawing, like features may be illustrated with the same reference numerals, without further mention thereof. Further, the foregoing figures are merely exemplary, and may contain various elements that might be present or omitted from actual implementations of various embodiments depending upon the circumstances. The features as illustrated provide an exemplary embodiment for a sprinkler that may control rotational speed of the sprinkler, and water volume applied along a radial length, at the same time. An attempt has been made to draw the figures in a way that illustrates at least those elements that are significant for an understanding of the various embodiments and aspects of the invention. However, various other elements of a lawn sprinkler with water flow restrictor designs, or gear train designs, especially as applied for different variations of the functional components illustrated, as well as different embodiments such as a shape of components or final design of various elements, may be utilized in order to provide a useful, reliable, lawn sprinkler in a pop-up sprinkler design useful for minimizing waste of water and in normalizing the application rate of water (on an irrigation volume per square foot or similar basis) over areas of a lawn, particularly for irregular or other non-circular lawn shapes.

DETAILED DESCRIPTION

Attention is directed to FIG. 1 of the drawing, which provides a perspective view of an exemplary non-circular, irregular shaped lawn 20. Lawn 20 may be irrigated using a lawn sprinkler 22 as described herein in order to water the irregularly shaped lawn while minimizing or substantially eliminating watering of areas beyond the perimeter 24 of the lawn 20. Further, in one embodiment, a relatively uniform volume of water per unit area (e.g., gallons per square foot of lawn 20 in a given period of time, or alternate measurement such as inches of rainfall equivalent over the irrigated area in a given period of time) may be provided to lawn 20, using pop-up type sprinkler 22. Sprinkler 22 may, in an embodiment, be configured to rotate, such as in the direction of the clockwise reference arrows 26 and 28. As the angle of rotation changes from a starting point (such as that at a reference angle zero ($A_0$) along radial $R_0$ having a length $LR_0$ between sprinkler 22 and perimeter 24) to other angles of rotation about sprinkler 22, for example to $A_1$, $A_2$, $A_3$, etc. to an $A_N$, (where N is a positive integer representing an angle between 0 and 360 degrees), then the volume of water provided via sprinkler 22 is regulated so that a nozzle 30 (see FIG. 9) in sprinkler 22 delivers a regulated volume of water for a regulated length of time along a suitable radial length $LR_1$, $LR_2$, $LR_3$. etc. along radials $R_1$, $R_2$, $R_3$, etc., as indicated for example in FIG. 1.

As shown in FIGS. 2, 3, 7, 8, and 9, an exemplary lawn sprinkler 22 may be provided in a pop-up operational configuration. Such an embodiment includes a sprinkler base 32 having a sprinkler base chamber 34 defined by a sprinkler base inner side wall 36. The sprinkler base chamber 34 has an inlet 38 for receiving a pressurized water flow, as indicated by reference arrow 40 in FIG. 9 or 9A.

Figure 2:
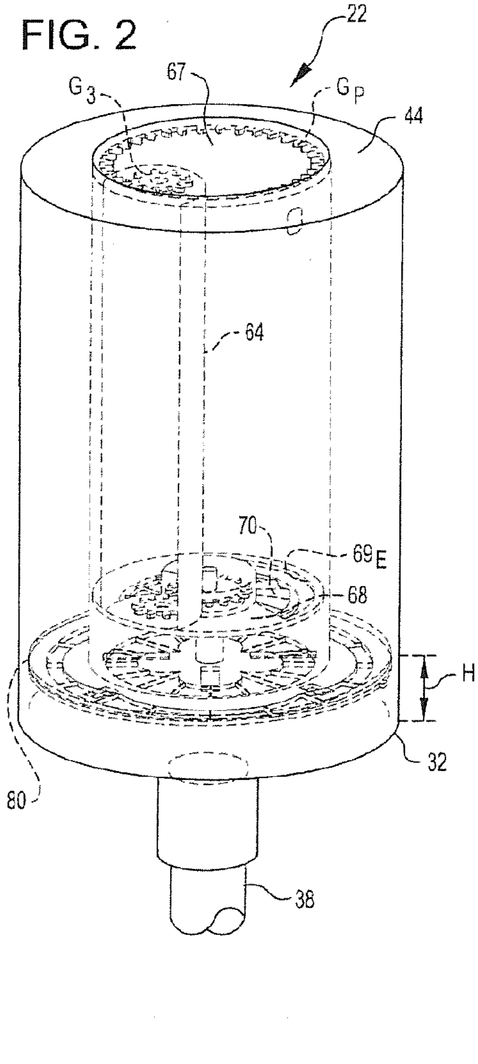
FIG. 2 is a perspective view of a first embodiment of a pop-up lawn sprinkler design, illustrating the sprinkler nozzle assembly located in its inoperative, resting position, nested within the sprinkler base, and showing at the bottom an inlet for a pressurized flow of water.
Figure 3:
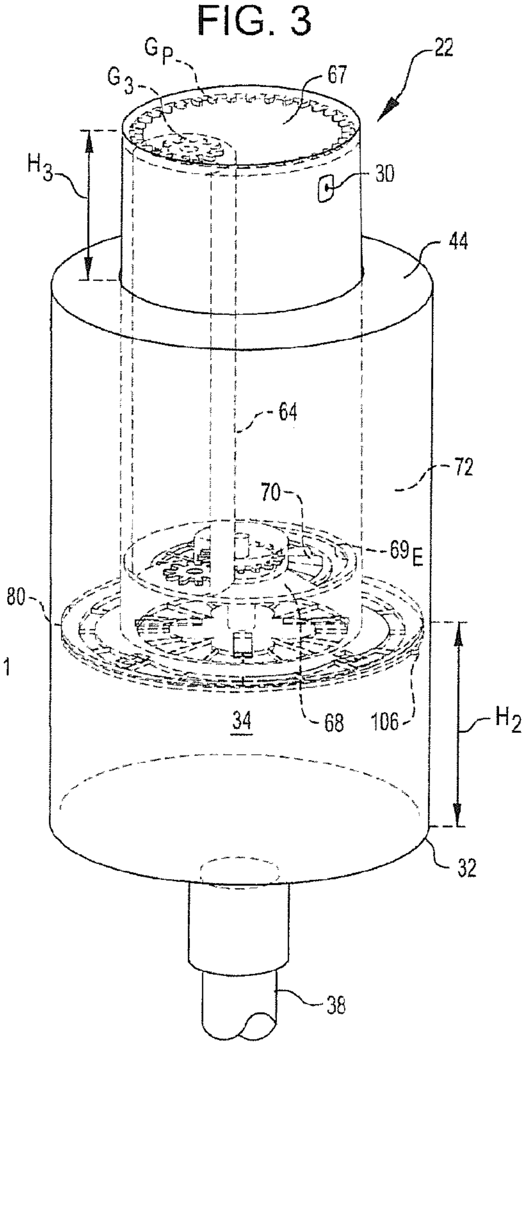
FIG. 3 is a perspective view of embodiment just illustrated in FIG. 3 above, now showing the sprinkler nozzle assembly located in its pop-up, operating position.
Figure 7:
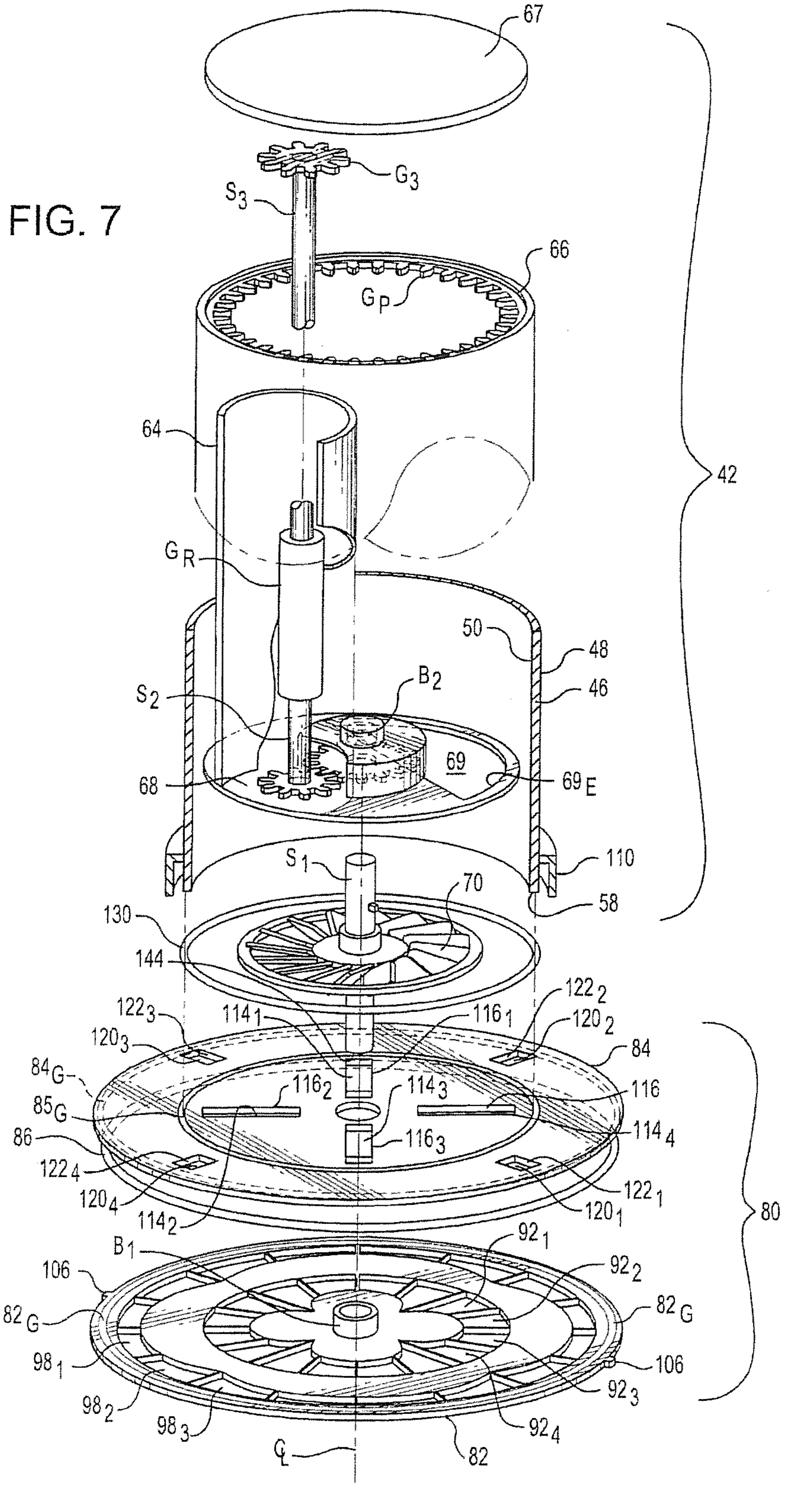
FIG. 7 is an exploded perspective view, showing a first flow restrictor, a second flow restrictor, an outer O-ring that is used to effectively seal the joint between a stationary first flow restrictor and a rotating second flow restrictor, then an inner O-ring that is used to effectively seal the joint between the second flow restrictor and the housing of the sprinkler nozzle assembly (which housing preferably rotates at the same speed as the second flow restrictor), then an impeller, and a gear train driven by the impeller that acts through a shaft, a driving gear, and a planetary gear to provide rotary movement to the sprinkler nozzle assembly.
Figure 8:
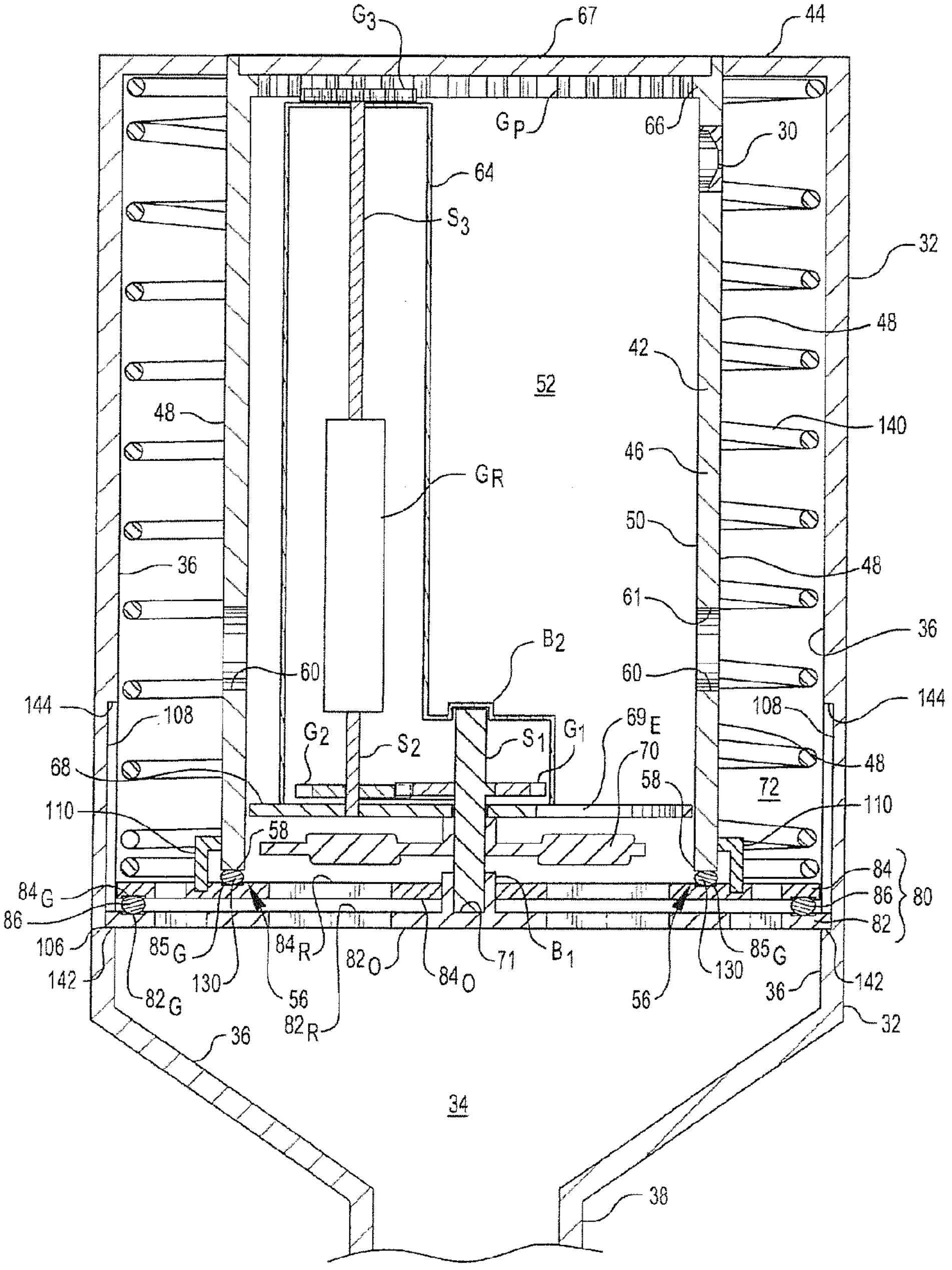
FIG. 8 is a vertical cross-sectional view of the embodiment just illustrated in FIGS. 2, 3, and 7 above, now showing the sprinkler nozzle assembly located in an inoperative position, with the spring biasing the flow restrictor assembly downward, so that the top of the sprinkler nozzle assembly is flush with the top of the stationary sprinkler base.
Figure 9:
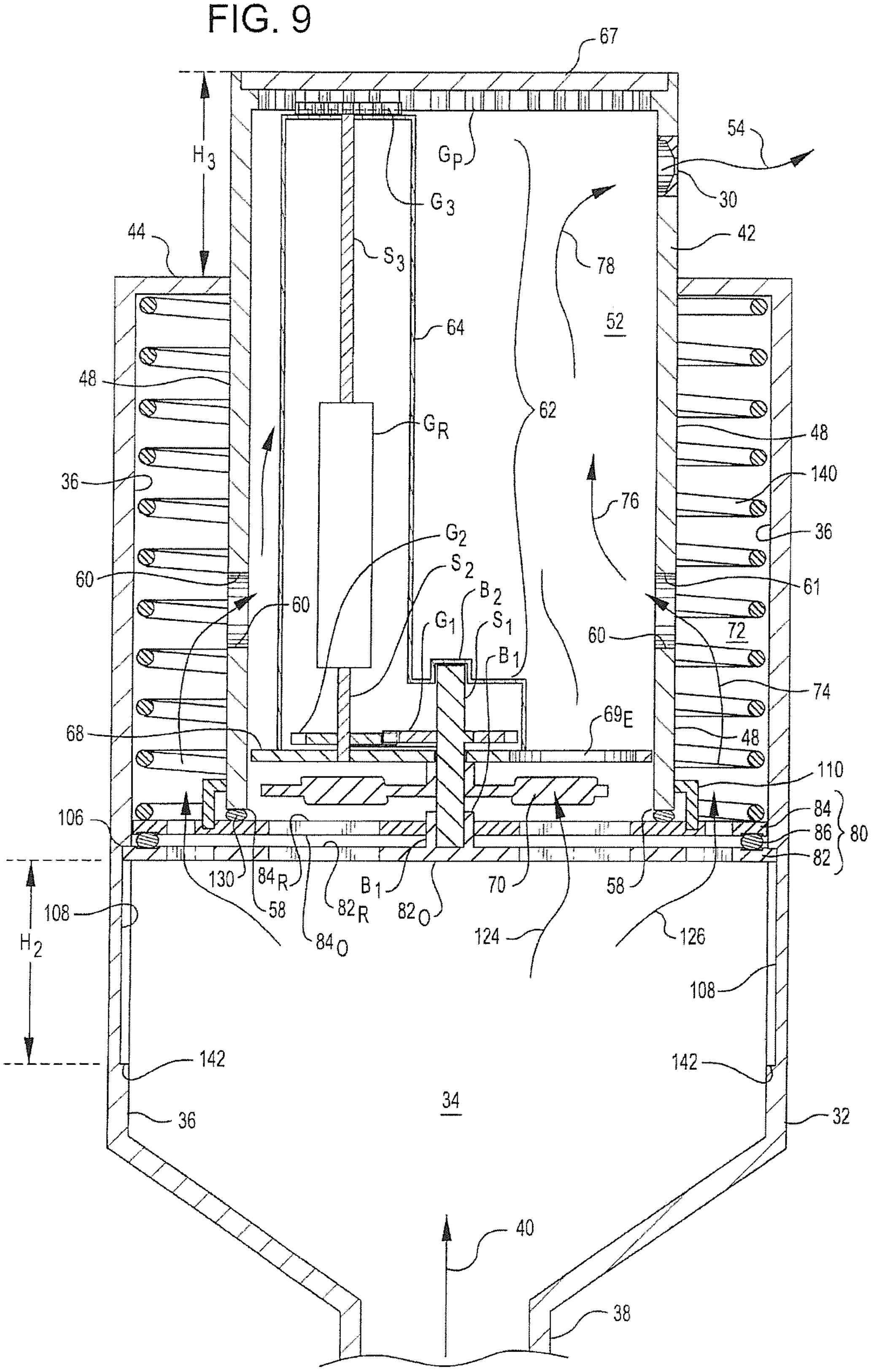
FIG. 9 is a vertical cross-sectional view of the embodiment just illustrated in FIGS. 2, 3, 7, and 8 above, but now showing the sprinkler nozzle assembly in an operating, pop-up position, with the pressurized water flow biasing the flow restrictor assembly upward against an upper end stop, so that the nozzle is exposed for projection of a water stream outward from the sprinkler nozzle assembly.
Figure 9A:
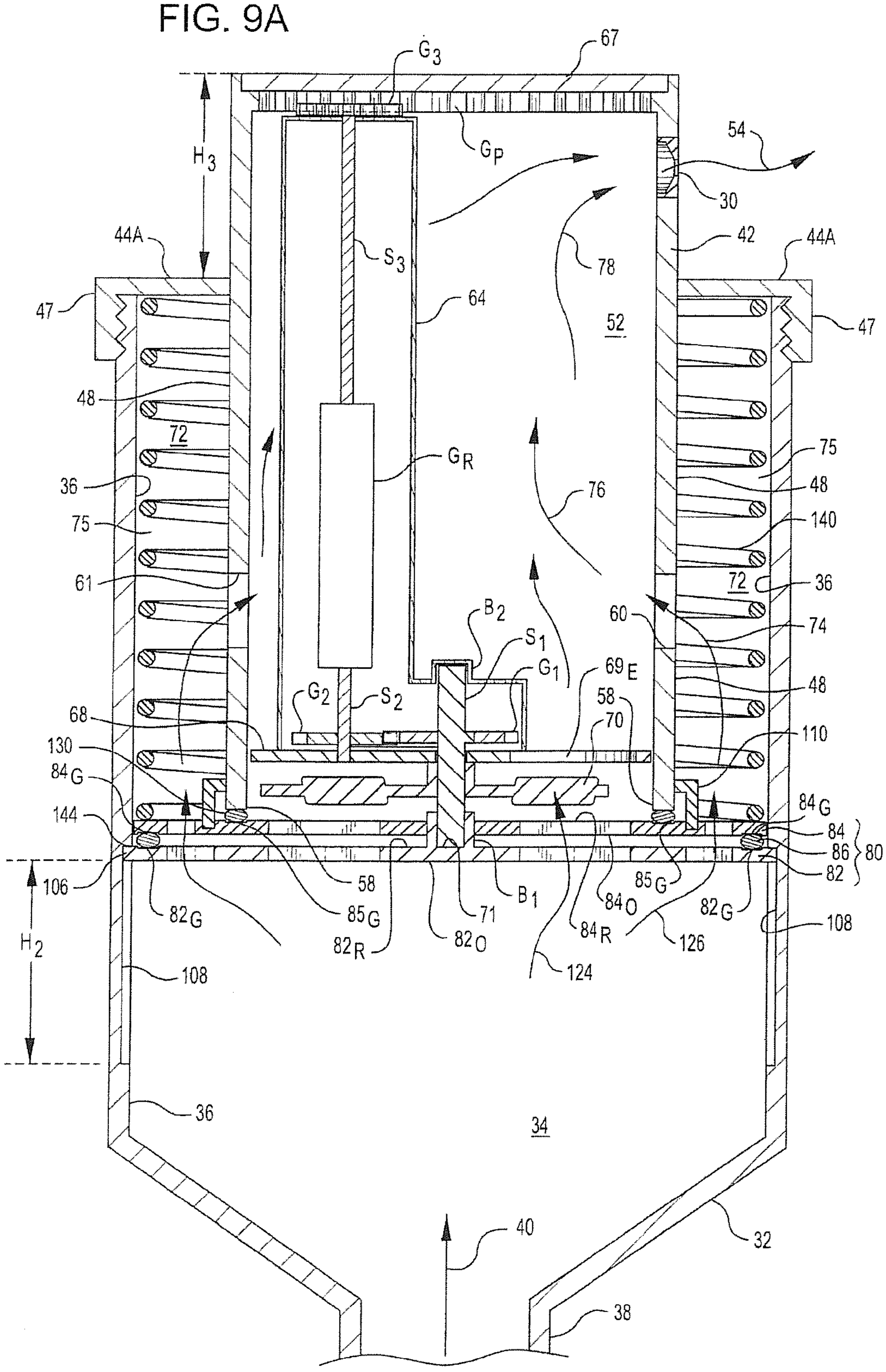
FIG. 9A is a vertical cross-sectional view, similar to the embodiment just illustrated in FIGS. 2, 3, 7, and 8 above, but now showing an embodiment in which a removable cap is utilized to allow ease of final assembly and maintenance of the components of the sprinkler nozzle assembly.

A sprinkler nozzle assembly 42 is rotatably coupled to the sprinkler base 32 and configured for operative pop-up extension upward a distance $H_3$ as indicated in FIG. 3 or 9, relative to the top 44 of base 32 (or relative to top 44A of screw on cap 47 as seen in FIG. 9A). As seen in FIG. 8, the sprinkler nozzle assembly 42 includes a sprinkler nozzle assembly housing 46, which housing has an outer wall 48 and an inner wall 50. In an embodiment, as shown in FIGS. 2, 3, 7, and 8, the inner wall 50 defines a sprinkler nozzle assembly chamber 52 which receives water therein, and for discharge therefrom. Nozzle 30, operatively located with or as an exit port from sprinkler nozzle assembly chamber 52, is adapted for discharging water therethrough, as indicated by reference arrow 54 in FIGS. 9 and 9A. As seen in FIG. 8, a sprinkler nozzle assembly primary inlet 56 is defined at, and by, the lower end portion 58 of sprinkler nozzle assembly housing 46. The sprinkler nozzle assembly primary inlet 56 is in fluid communication with nozzle 30, via sprinkler nozzle assembly chamber 52. A sprinkler nozzle assembly bypass inlet 60 is provided, which as shown in FIGS. 8 and 9 can be provided as defined by through wall apertures defined by edgewall portions 61 in sprinkler nozzle assembly housing 46. The sprinkler nozzle assembly bypass inlet 60 is thus also in fluid communication with the nozzle 30.

A transmission 62 is provided. As illustrated in FIG. 9, the transmission 62 may have a housing 64 that houses at least a portion of a gear mechanism, such as gears $G_1$, $G_2$, and $G_3$. Various shafts $S_1$, $S_2$, and $S_3$, as well as a reduction gear package $G_R$ as depicted in the embodiment shown in FIGS. 8 and 9 may also be provided wholly or partially within or supported by gear housing 64. The driven planetary gear $G_p$ may be outside of housing 64 and in one embodiment as illustrated in FIGS. 9 and 9A may be located at the internal periphery 66 of sprinkler nozzle assembly 42 adjacent the top 67 thereof. The various shafts $S_1$, $S_2$, $S_3$, et cetera, and the reduction gear package $G_R$, as well as the other parts of transmission 62 (e.g., bushings $B_1$ and $B_2$ and support 68) are secured in working relationship with the sprinkler nozzle assembly 42. In an embodiment, the transmission 62 includes an impeller 70 and gear mechanism including gears, shafts, and gear reduction package as just mentioned, to transfer force from the impeller 70 to rotationally drive the sprinkler nozzle assembly 42. Also, as seen in FIG. 7, support 68 may include a cutout or water flow passageway 69 which may be defined by passageway edgewall 69$_E$, through which water flows after passage across impeller 70. In one embodiment, the first flow restrictor 82 supports bushing $B_1$, and the lower end 71 of shaft $S_1$, which shaft $S_1$ is secured to impeller 70, turns in bushing $B_1$.

As indicated in FIGS. 9 and 9A, a sprinkler nozzle assembly bypass passageway 72 is provided to conduct water therethrough as indicated by reference arrow 74 in FIG. 9. The sprinkler nozzle assembly bypass passageway 72 is defined between at least an upper portion 75 of the sprinkler base inner side wall 36 and a portion of the sprinkler nozzle assembly housing outer wall 48. The sprinkler nozzle assembly bypass passageway 72, when sprinkler 22 is in operation, is in fluid communication with the sprinkler base chamber 34 and with the sprinkler nozzle assembly bypass inlet 60, the latter of course being in fluid communication with nozzle 30, as indicated by reference arrows 76 and 78 in FIGS. 9 and 9A.

As shown in FIGS. 7, 9, and 9A, a flow restrictor assembly 80 is provided, including a lower or first flow restrictor 82, and an upper or second flow restrictor 84. As better seen in FIG. 8, 9, or 9A, an outer O-ring 86 is provided between first flow restrictor 82 and second flow restrictor 84. The outer O-ring is seated in lower groove 82$_G$. The upper or second flow restrictor 84 rides above outer O-ring 86 at upper groove 84$_G$.

Figure 4:
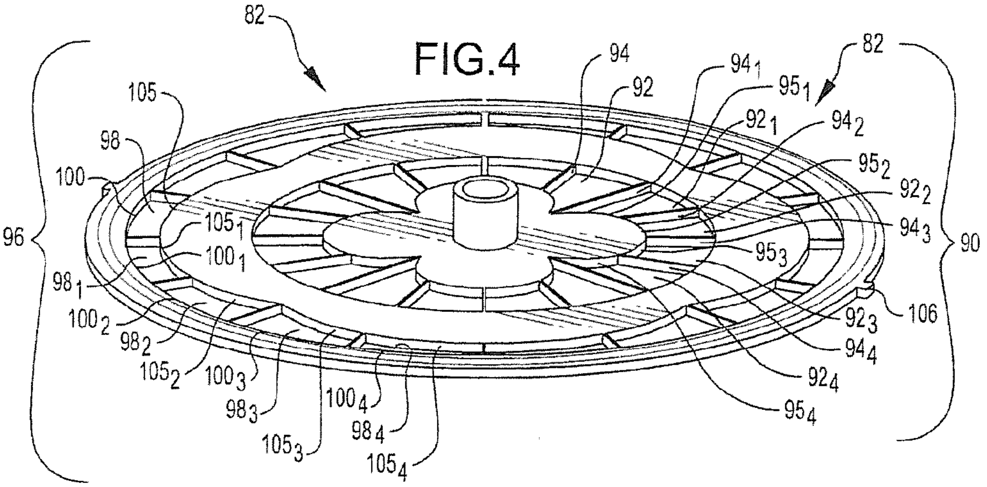
FIG. 4 is a perspective view of a first flow restrictor, showing, for this embodiment a generally circular perforated disk shape with a plurality of anti-rotation guide tabs extending outward from the periphery thereof.

As shown in FIG. 4, the first flow restrictor 82 includes a first flow restrictor inner portion 90 that has at least one first flow restrictor inner aperture 92 with a cross-section open area defined by at least one first flow restrictor inner aperture sidewall 94. Multiple first flow restrictor inner apertures 92$_1$, 92$_2$, 92$_3$, 92$_4$, through 92$_N$, with corresponding multiple first flow restrictor inner aperture sidewalls 94$_1$, 94$_2$, 94$_3$, 94$_4$, through 94$_N$, where N is a positive integer, may be provided in many embodiments, as indicated, for example, in FIG. 4. One or more variable edges such as 95$_1$, 95$_2$, 95$_3$, 95$_4$, through 95$_N$ may be provided in order to vary the flow of water through the first flow restrictor inner apertures 92$_1$, 92$_2$, 92$_3$, 92$_4$, through 92$_N$.

Likewise, the first flow restrictor 82 includes an outer portion 96. The first flow restrictor outer portion 96 has at least one first flow restrictor outer aperture 98 with a cross-section open area defined by at least one first flow restrictor outer aperture sidewall 100, Multiple first flow restrictor outer apertures 98$_1$, 98$_2$, 98$_3$, 98$_4$, through 98$_N$, with corresponding multiple first flow restrictor aperture sidewalls 100$_1$, 100$_2$, 100$_3$, 100$_4$, through 100$_N$, where N is a positive integer, may be provided in many embodiments, as indicated, for example, in FIG. 4. One or more variable edges 105, such as 105$_1$, 105$_2$, 105$_3$, 105$_4$, through 105$_N$ may be provided in order to vary the flow of water through the first flow restrictor outer apertures 98$_1$, 98$_2$, 98$_3$, 98$_4$, through 98$_N$.

In one embodiment, as illustrated in FIGS. 8 and 9, for example, the first flow restrictor 82 may include one or more guide tabs 106 suited for location in complementary tab grooves or slots 108 in sprinkler base 32. In such an embodiment, interaction of guide tabs 106 with tab grooves or slots 108 prevents the first flow restrictor 82 from rotating within the base 32 of sprinkler 22. However, the first flow restrictor 82 may move upward in response to pressurized water flow or downward in response to action of the biasing spring 140, as further described herein, while the first restrictor 82 is prevented from rotary movement by the interaction of the guide tabs 106 and the tab grooves or slots 108.

In the embodiment just referenced, the second flow restrictor 84 is configured for rotary movement relative to the first flow restrictor 82. As shown in FIGS. 7 and 9, connector 110 operatively couples the second flow restrictor 84 with the sprinkler nozzle assembly 42. In this manner, the second flow restrictor 84 rotates at the same angular speed as the sprinkler nozzle assembly 42. Regardless of the precise mechanical linkage or operable configuration, or which flow restrictor actually moves, the second flow restrictor 84 and the first flow restrictor 82 are configured for rotary movement relative to each other. The second flow restrictor 84 includes a second flow restrictor inner portion 112. The second flow restrictor inner portion 112 has at least one second flow restrictor inner aperture 114 with a cross sectional area defined by at least one second flow restrictor inner aperture sidewall 116. Multiple second flow restrictor inner apertures 114$_1$, 114$_2$, 114$_3$, through 114$_N$, with corresponding multiple first flow restrictor aperture sidewalls 116$_1$, 116$_2$, 116$_3$, through 116$_N$, where N is a positive integer, may be provided in many embodiments, as indicated, for example, in FIG. 6.

The second flow restrictor has an outer portion 118. The second flow restrictor outer portion 118 has at least one second flow restrictor outer aperture 120 with a cross-sectional water flow passageway area defined by at least one second flow restrictor outer aperture sidewall 122. Multiple second flow restrictor outer apertures 120$_1$, 120$_2$, 120$_3$, through 120$_N$, with corresponding multiple first flow restrictor aperture sidewalls 122$_1$, 122$_2$, 122$_3$, through 122$_N$, where N is a positive integer, may be provided as indicated, for example, in the embodiment suggested by the details shown in FIG. 6.

The at least one first flow restrictor inner portion apertures 92 are hydraulically coupled with the sprinkler base chamber 34. The at least one first flow restrictor inner portion apertures 92 and the at least one second flow restrictor inner portion apertures 114 are cooperatively positioned to operatively modulate the flow rate of a first water flow as indicated by reference arrow 124 in FIGS. 9 and 9A, to drive the impeller 70. This is accomplished by increasing and decreasing intersecting cross sectional area for water flow through (a) the cross-sectional area defined by the at least one first flow restrictor inner aperture 92, and (b) the cross-sectional area defined by the at least one second flow restrictor inner aperture 114.

The second flow restrictor inner portion apertures 114 are hydraulically coupled to the sprinkler nozzle assembly primary inlet 56. The second flow restrictor outer apertures 120 are hydraulically coupled with the sprinkler nozzle assembly bypass passageway 72.

The at least one first flow restrictor outer portion apertures 98 are in fluid communication with the sprinkler base chamber 34. The at least one first flow restrictor outer portion apertures 92 and the second flow restrictor outer apertures 120 are cooperatively positioned to operatively modulate flow rate of a second water flow as indicated by reference arrow 126 in FIGS. 9 and 9A, which second water flow enters the sprinkler nozzle bypass passageway 72, by increasing and decreasing intersecting cross sectional area available for water flow through both the at least one first flow restrictor outer aperture 92 cross-sectional area and the at least one second flow restrictor outer aperture 120 cross-sectional area.

The at least one first flow restrictor 82 and the at least one second flow restrictor 84 are arranged for relative rotary movement with respect to each other so that, if and as necessary to water an irregularly shaped parcel of lawn 20, the first water flow rate as indicated by reference arrow 124 increases and said second water flow rate 126 decreases over a selected first unit of time, and so that the first water flow rate as indicated by reference arrow 124 decreases while the second water flow rate 126 increases over a second unit of time. This facilitates increased water volume being applied to lawn 20 at longer radial distances (e.g., $R_3$ and $R_8$ in FIG. 1), while the sprinkler 22 rotates at a slower rate, and then, decreased water volume being applied at a shorter radial distance (e.g., $R_6$ in FIG. 1), while the sprinkler 22 rotates at a faster rate.

Figure 10:
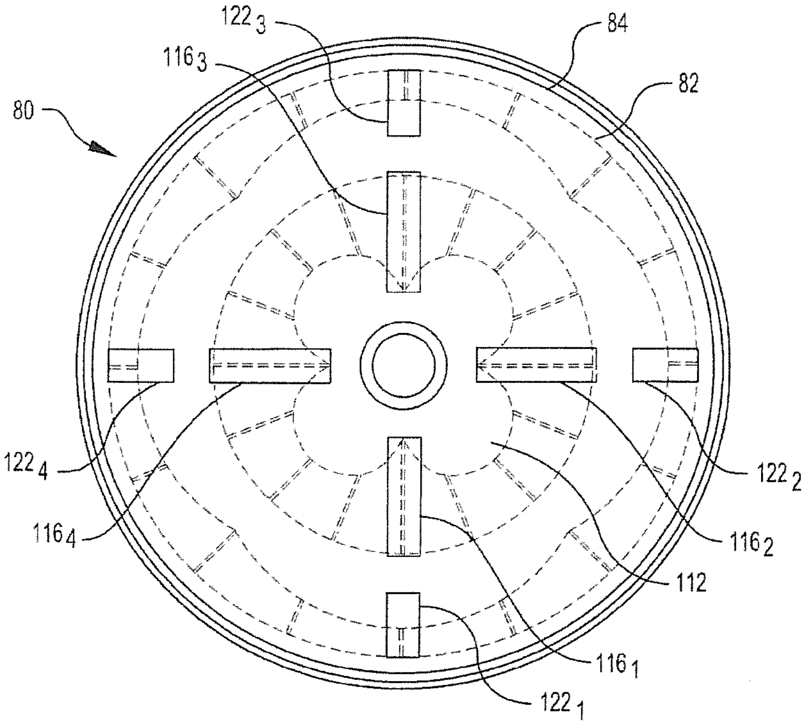
FIG. 10 is a plan view of a flow restrictor assembly, showing the upper or second flow restrictor in solid lines, and the lower or first flow restrictor in hidden lines. The water flow rates delivered from such a juxtaposition of the first and second flow restrictors correspond to deliver substantially uniform water application per unit of surface area of a lawn of the shape illustrated in FIG. 11.
Figure 11:
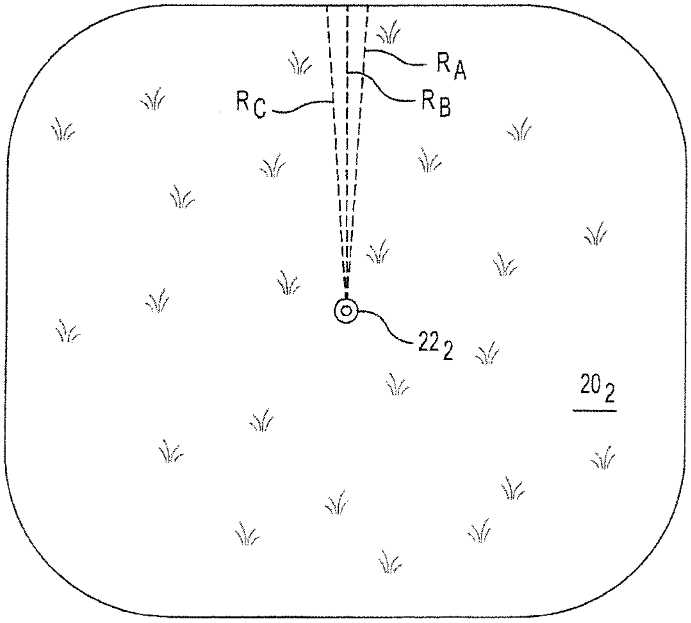
FIG. 11 is a plan view of another non-circular lawn area that is to be watered, preferably with a relatively uniform volume of water per square foot of lawn wherever located, via a rotating sprinkler that provides water substantially along vectors of differing radial lengths from the sprinkler, showing watering along short vectors, where the rotary speed of the sprinkler nozzle assembly will be increased.

The operational scheme just described above is also easily visualized by reference to FIGS. 10, 11, 12, and 13, wherein a lawn $\mathbf{20}_2$ is indicated for application of water via sprinkler $\mathbf{22}_2$. Flow restrictor assembly 80 is shown in juxtaposed relationship at a first unit of time in FIG. 10, with respect to application along radials $R_A$, $R_B$, and $R_C$ as indicated in FIG. 11. In this relationship, at a first unit of time when the sprinkler $\mathbf{22}_2$ is watering along radials $R_A$, $R_B$, and $R_C$, the second water flow rate 126 decreases, in order to limit the amount of water provided to nozzle 30 for watering of relatively short radials $R_A$, $R_B$, and $R_C$ as shown in FIG. 11. At the same first unit of time, the first water flow rate as indicated by reference arrow 124 is increased, due to a larger common passageways defined by the aperture edge walls as noted above, as between the inner portions of first and second flow restrictors 82 and 84, as can be easily seen in FIG. 10.

Figure 12:
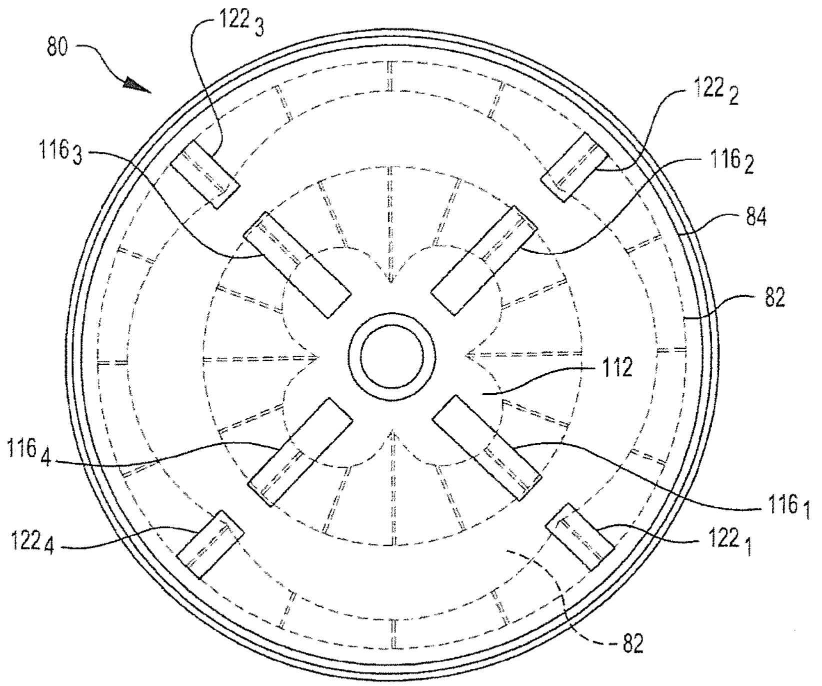
FIG. 12 is a plan view of a flow restrictor assembly, similar to FIG. 10 above, and again showing the upper or second flow restrictor in solid lines, and the lower or first flow restrictor in hidden lines, but now showing the upper flow restrictor rotated forty five (45) degrees, so that the water flow rates through the flow restrictor assembly match the flow rates required for watering that portion of a lawn as indicated in FIG. 13.
Figure 13:
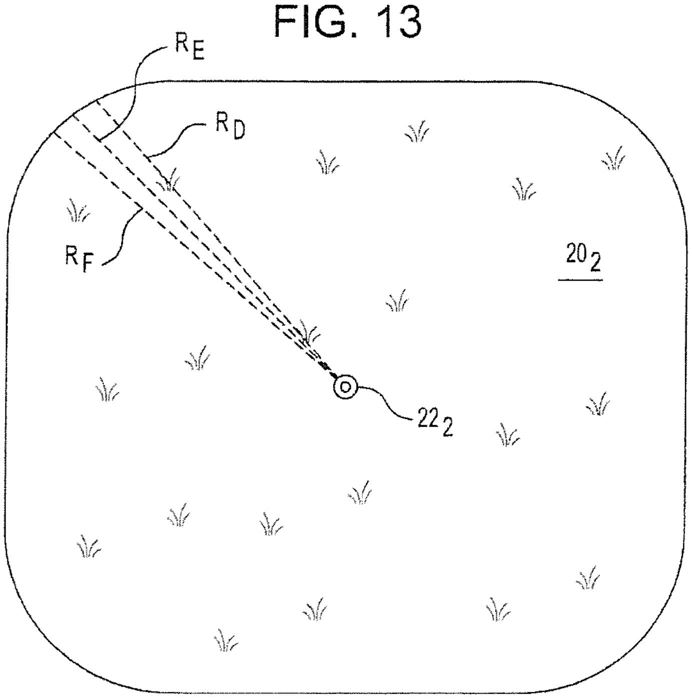
FIG. 13 is a plan view of the non-circular lawn area just illustrate in FIG. 11 above, but now showing watering along longer radial lengths from the sprinkler, which as described herein will preferably be provided with a substantially uniform volume of water per square foot of lawn, wherever located, from the rotating sprinkler nozzle assembly.

Similarly, as shown in FIGS. 12 and 13, the flow restrictor assembly 80 is shown juxtaposed in relationship at a second unit of time, for watering along longer radial lengths $R_D$, $R_E$, and $R_F$. During such second unit of time, the second water flow rate 126 increases, in order to provide more water to the nozzle 30 for watering along the relatively longer radials $R_D$, $R_E$, and $R_F$ as indicated in FIG. 13. At the same second unit of time, the first water flow rate as indicated by reference arrow 124 is decreased, due to smaller common passageways defined by the aperture edge walls as noted above, as between the inner portions of first and second flow restrictors 82 and 84, as can be easily seen in FIG. 12.

As can be appreciated by comparison of FIGS. 10 and 12, as well as examination of the lawn shape $\mathbf{20}_2$, it can be seen that the precise design of first 82 and second 84 flow restrictors can be tailor made or individually designed. Thus, an open area in the inner and in the outer portions of each of the first 82 and second 84 flow restrictors can be suitably juxtaposed or matched, so that a given lawn size and shape can be properly watered by a lawn sprinkler, or by a plurality of lawn sprinklers, with complementary or minimally overlapping patterns, where appropriate. In FIGS. 10 and 12, the lower or first flow restrictor 82 is shown in hidden lines, whereas the upper or second flow restrictor 84 is shown in black lines. These first 82 and second 84 flow restrictors are shown in an embodiment as situated in coaxial relationship for rotation of the second 84 flow restrictor above the lower or first flow restrictor 82. Further, the precise shape of the inner sidewall 95 of the at least one first flow restrictor 82 inner aperture 92 may be provided in a curving contoured shape. See, for example, inner sidewall $\mathbf{95}_4$ as illustrated in FIG. 4. Further, one of the at least one sidewalls of the at least one first flow restrictor 82 outer aperture 98 may be provided in a curving contoured shape. See, for example, sidewall $\mathbf{105}_2$ as illustrated in FIG. 4.

In the apparatus depicted in FIGS. 8 and 9, the sprinkler nozzle assembly 42 is arcuately driven by the transmission 62 as described above about at least a portion of an axis of rotation (defined along rotational centerline $C_L$ as indicated in FIG. 7) of the sprinkler nozzle assembly 42. In an embodiment, the sprinkler nozzle assembly 42 revolves completely around, i.e., in a continual but controlled variable speed rotary motion, about the axis of rotation $C_L$. With respect to the controlled variable rotary motion, as just noted above, the transmission is configured to operatively increase the arc speed of said sprinkler nozzle assembly 42 in response to an increase in first water flow as indicated by reference arrow 124 to the impeller 70 during a first unit of time. The nozzle 30 operatively decreases the radial length that water is projected along a first vector, such as any one of $R_A$, $R_B$, and $R_C$ as indicated in FIG. 11, in response to the decrease in second water flow 126, i.e., via water pressure modulation, to the sprinkler nozzle assembly bypass inlet 60. More generally, the first flow restrictor 82 and the second flow restrictor 84 are shaped and sized to cooperatively regulate and ultimately provide delivery of variable quantities of water for discharge from the nozzle 30 along variable radial lengths, while maintaining a substantially constant volume of water per unit area of a lawn 20 over a given unit of time.

Figure 5:
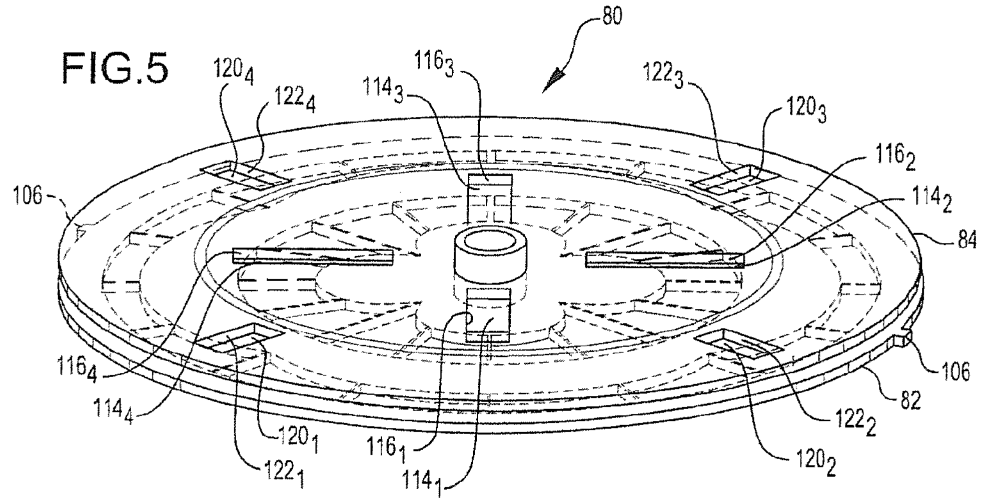
FIG. 5 is a perspective view of a flow restrictor assembly in a first rotary position, showing the edge of a lower, first flow restrictor, and thereabove, a second flow restrictor which is also provided in a generally circular, perforated disk shape, but mounted for rotary movement relative to the first flow restrictor, so that when water passageways through each of the flow restrictors effectively overlap, water is allowed to flow through the flow restrictor assembly. As configured in FIG. 5, the overlapping water passageways are configured for a slow rotational movement, with lots of water bypassing the impeller, to increase total water flow, and is applicable for water placement along a long radius such as along $R_8$ in FIG. 1.
Figure 6:
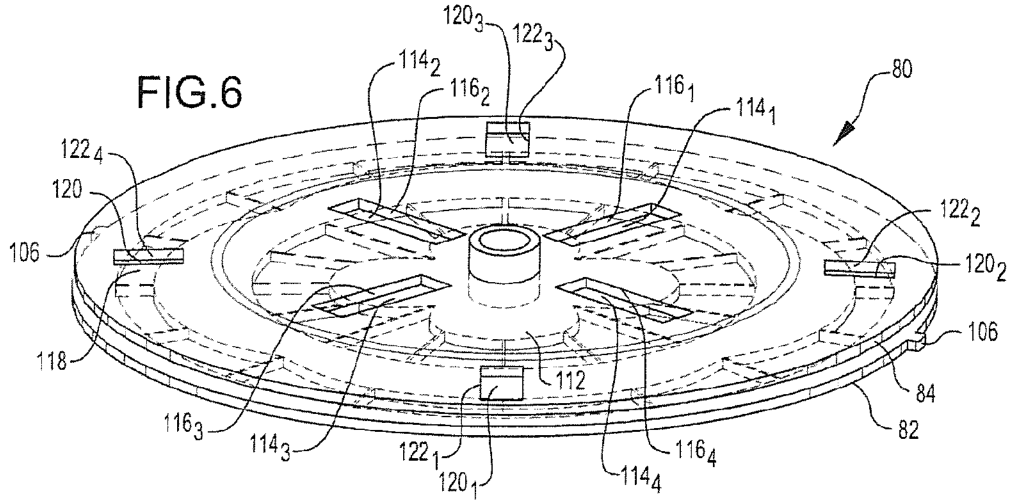
FIG. 6 is a perspective view of a flow restrictor assembly in a second rotary position, again showing the lower, first flow restrictor, and thereabove, a second flow restrictor which is also provided in a generally circular, perforated disk shape, but mounted for rotary movement relative to the first flow restrictor, so that when water passageways through each of the flow restrictors effectively overlap, water is allowed to flow through the flow restrictor assembly. As configured in FIG. 6, the overlapping water passageways are configured for a fast rotational movement, with minimal water bypassing the impeller, to decrease the total water flow, as applicable for water placement along a relatively short radius such as along $R_5$ in FIG. 1.

As generally described above and illustrated in the drawing figures, the at least one first flow restrictor 82 may be provided in the form of a perforated disk. Similarly, the at least one second flow restrictor 84 may be provided in the form of a perforated disk. Moreover, as shown in FIGS. 4, 5, and 6, for example, the at least one first flow restrictor 82 inner aperture 92 may be provided in the form of a plurality of first flow restrictor inner apertures $\mathbf{92}_1$, $\mathbf{92}_2$, $\mathbf{92}_3$, Likewise, the at least one first flow 82 may have first flow restrictor outer apertures provided in the form of a plurality of first flow restrictor outer apertures $\mathbf{98}_1$, $\mathbf{98}_2$, $\mathbf{98}_3$, etc.

Similarly, as generally described above and illustrated in the drawing figures, the at least one second flow restrictor 84 inner aperture 114 may be provided in the form of a plurality of second flow restrictor inner apertures $\mathbf{114}_1$, $\mathbf{114}_2$, $\mathbf{114}_3$, etc. Likewise, the at least one second flow restrictor outer aperture 120 may be provided in the form of a plurality of second flow restrictor outer apertures $\mathbf{120}_1$, $\mathbf{120}_2$, $\mathbf{120}_3$, etc.

In one embodiment, the first flow restrictor 82 has an obverse side $\mathbf{82}_O$ and a reverse side $\mathbf{82}_R$. The reverse side $\mathbf{82}_R$ may be provided in a substantially planar configuration. Also, the second flow restrictor 84 has an obverse side $\mathbf{84}_O$ and a reverse side $\mathbf{84}_R$. The obverse side $\mathbf{84}_O$ may be provided in a substantially planar configuration. As illustrated in FIGS. 5 and 6, the obverse side $\mathbf{84}_O$ of the second flow restrictor and the reverse side $\mathbf{82}_R$ of the first flow restrictor may be provided in an adjacent configuration. As seen in FIG. 7 and further shown in FIG. 8, an outer O-ring 86 may be provided and positioned between the reverse side $\mathbf{82}_R$ of the first flow restrictor 82 and the obverse side $\mathbf{84}_O$ of the second flow restrictor 84. In one embodiment, as shown for example in FIGS. 8, 9, and 9A, the outer O-ring 86 sealingly separates the first flow restrictor 82 and the second flow restrictor 84, so that water passing through the first flow restrictor 82 is effectively confined and must pass onward in the direction of, and thence through, the second flow restrictor 84. To assist in the sealing separation just mentioned, the reverse side $\mathbf{82}_R$ of the first flow restrictor 82 may further include a first recessed groove $\mathbf{82}_G$ shaped and sized to accept and seat the outer O-ring 86. Additionally, the obverse side $\mathbf{84}_O$ of the second flow restrictor may be provided with a second recessed groove $\mathbf{84}_{G1}$ shaped and sized to accept and seat the outer O-ring 86.

An inner O-ring 130 may be provided, as variously shown in FIGS. 7, 8, 9, and 9A. The reverse side $\mathbf{84}_R$ of the second flow restrictor 84 then may include a third recessed grove $\mathbf{85}_G$ shaped and sized to accept and seat the inner O-ring 130. In an operable assembly, the sprinkler nozzle assembly housing 46 includes a lower end portion 58 that rides on the inner O-ring 130. The inner O-ring 130 effectively seals the space between the reverse side $\mathbf{84}_R$ of the second flow restrictor 84 and the lower end portion 58 of the sprinkler nozzle assembly housing 46.

Figure 17:
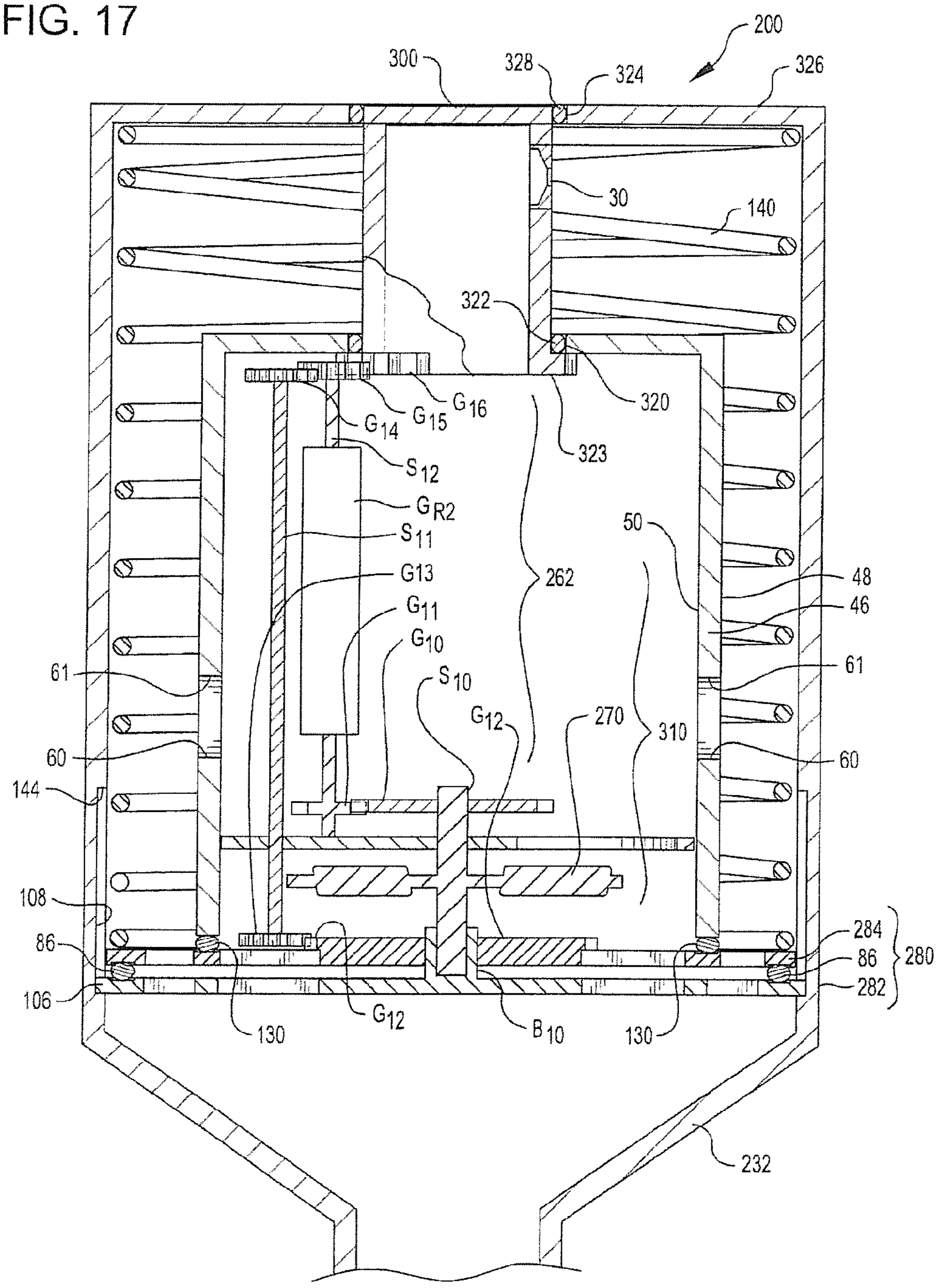
FIG. 17 is a vertical cross-sectional view of the second embodiment just illustrated in FIGS. 14, 15, and 16 above, now showing the sprinkler nozzle assembly located in an inoperative position, with the spring biasing the flow restrictor assembly downward, so that the top of the upwardly projecting nozzle housing is flush with the top of the stationary sprinkler base.
Figure 17A:
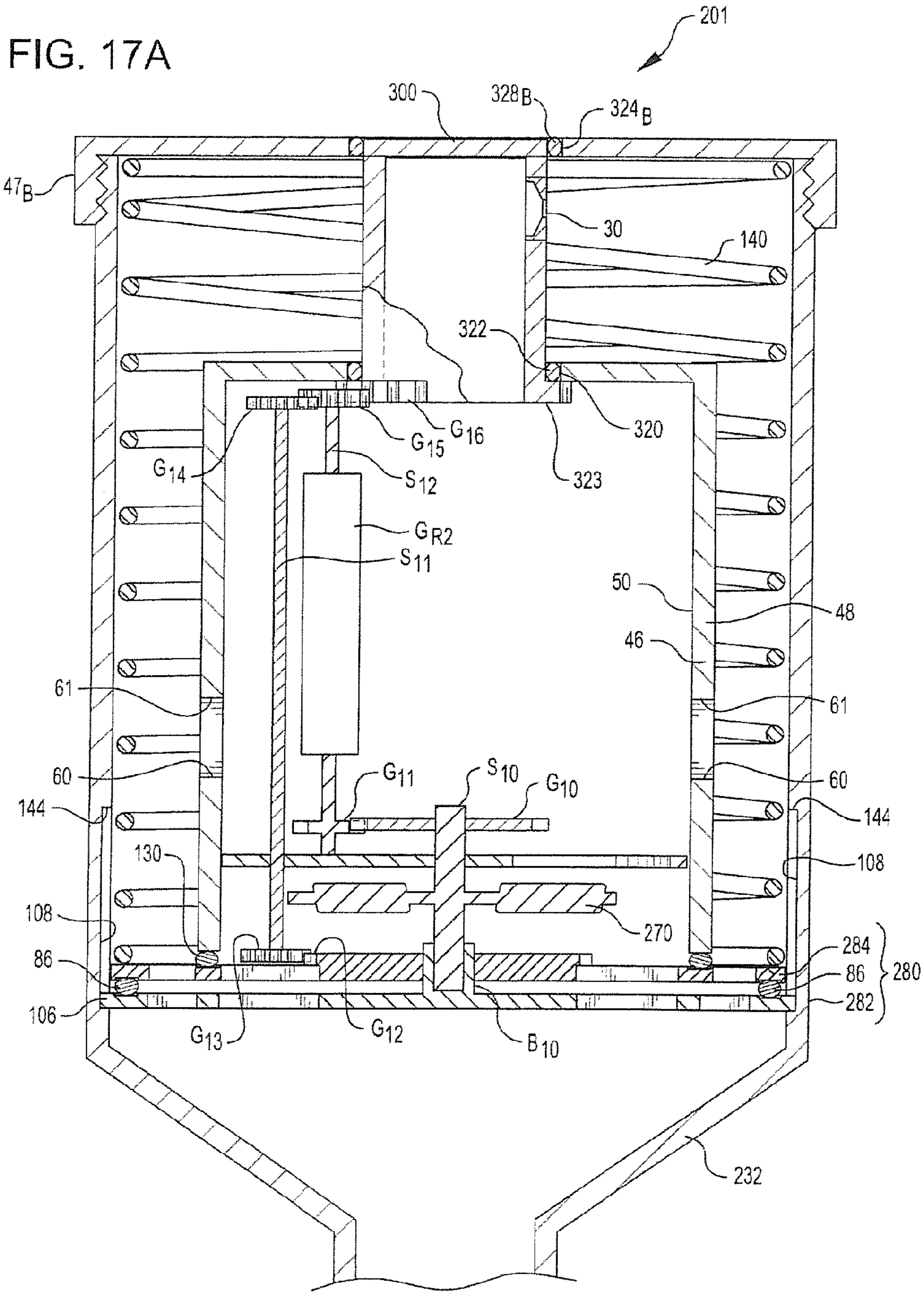
FIG. 17A is a vertical cross-sectional view, similar to the embodiment just illustrated in FIGS. 14, 15, and 16 above, but now shown the use of a removable cap, that may be utilized to allow ease of final assembly and maintenance of the components of the sprinkler nozzle assembly.

As noted in FIG. 9A, sprinklers configured as described herein may be provided in an embodiment having a screw-on cap 47, as illustrated in FIG. 9A, or $\mathbf{47}_B$, as illustrated in FIG. 17A. In such a configuration, caps 47 or $\mathbf{47}_B$, as applicable, may be used for providing access to the first 82 and second 84 flow restrictors, so that each of first 82 and second 84 flow restrictors are removably insertable in the sprinkler base, such as base 32.

As illustrated in FIGS. 8, 9, and 9A, the first 82 and second 84 flow restrictors may be provided in the form of a flow restrictor assembly 80. In an embodiment, such as seen by comparison of FIG. 8 with FIGS. 9 and 9A, at least a portion of the sprinkler nozzle assembly housing 46 may be extensible upward from within the sprinkler base 32. When not operative, the sprinkler nozzle assembly housing 46 is normally biased in a downward, closed position, so that the sprinkler nozzle assembly housing 46 is not in a "pop-up" position. The flow restrictor assembly 80, as well as the sprinkler nozzle assembly housing 46 connected therewith, is normally biased downward by spring 140. The spring 140 operatively biases the flow restrictor assembly 80 against pop-up movement, yet the flow restrictor assembly is responsive to pressurized water flow acting against the bottom or obverse side $\mathbf{82}_O$ of the first flow restrictor 82. Thus, when at rest, i.e., with no flow, the flow restrictor assembly is resting against stop 142 at height $H_1$, as indicated in FIG. 2. Then, in response to pressurized water flow acting against the bottom or obverse side $\mathbf{82}_O$ of the first flow restrictor 82, the flow restrictor assembly 80 rises upward. The spring 140 may be located between the outer wall 48 of the sprinkler nozzle assembly housing 46 and the sprinkler base inner sidewall 36. In an embodiment, the spring 140 may be provided as a coiled, generally helical spring. The flow restrictor assembly 80 has a resting position wherein the spring 140 biases the flow restrictor assembly 80 downward against pop-up movement to a lower end stop 142, which in the embodiment shown in FIG. 8, is in sprinkler base 32. Similarly, the flow restrictor assembly 80 has an operating position wherein the pressurized water flow (see reference arrow 40 in FIGS. 9 and 9A) acts against the flow restrictor assembly 80 to move the flow restrictor assembly 80 upward to an operating position against an upper end stop 144 of height $H_2$, as indicated on FIG. 3.

Figure 14:
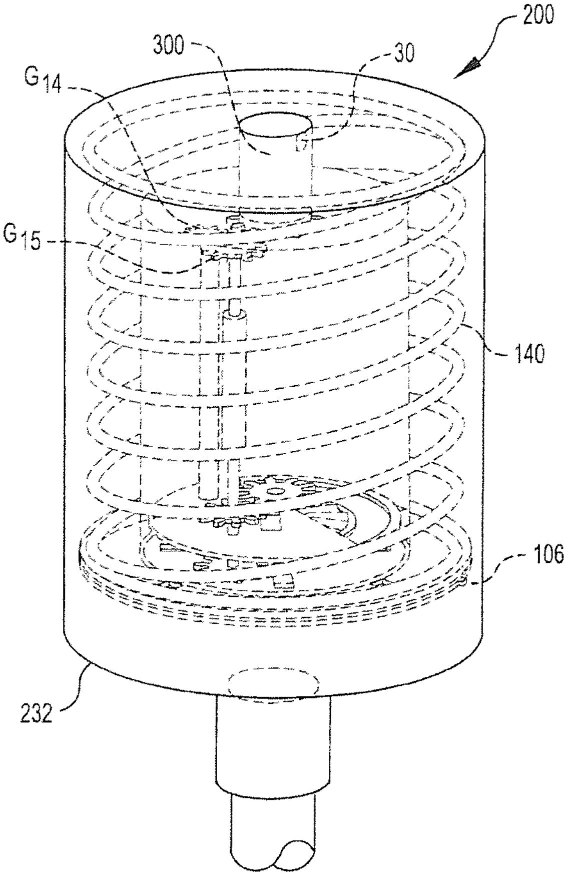
FIG. 14 is a perspective view of a second embodiment of a pop-up lawn sprinkler design, illustrating the sprinkler nozzle assembly located in its inoperative, resting position, nested within the sprinkler base, and showing at the bottom an inlet for a pressurized flow of water.
Figure 15:
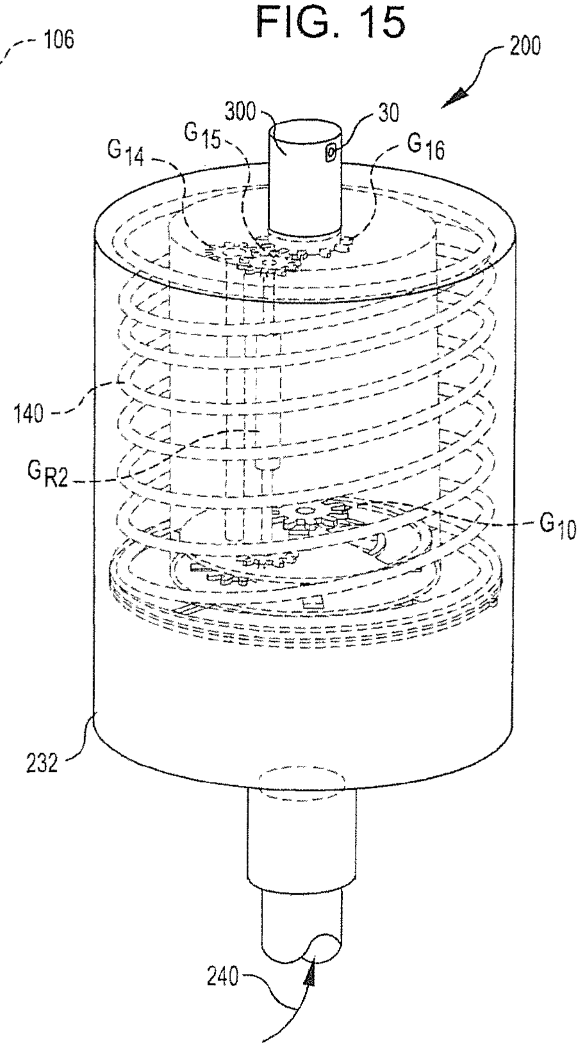
FIG. 15 is a perspective view of embodiment just illustrated in FIG. 14 above, now showing the sprinkler nozzle assembly and upwardly projecting nozzle housing located in its pop-up, operating position.

Turning now to FIGS. 14 though 18, another embodiment for an exemplary lawn sprinkler is described. Where applicable, a detailed description of like or similar parts to those already described hereinabove need not be repeated, and thus, like reference numerals have been provided for identification of such components, without further mention thereof.

Figure 16:
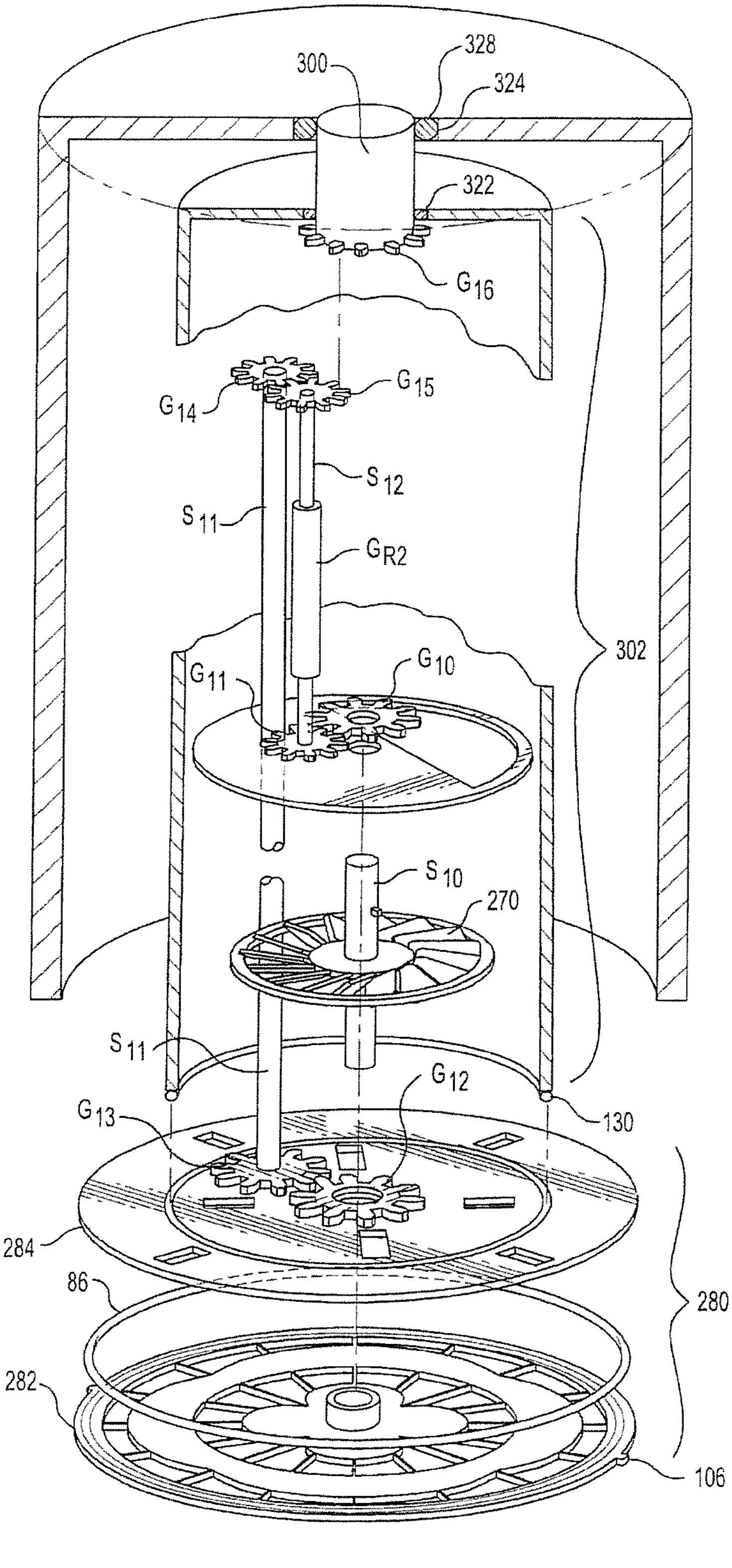
FIG. 16 is an exploded perspective view if a second embodiment of the invention, showing a first flow restrictor, a second flow restrictor, an outer O-ring to seal the joint between a stationary first flow restrictor and a rotating second flow restrictor, then an inner O-ring to effectively seal the joint between the second flow restrictor and the housing of the sprinkler nozzle assembly (which housing rotates at the same speed as the second flow restrictor, then an impeller, and a gear train driven by the impeller that acts, through a shaft, a driving gear, and a driven gear located below the nozzle housing to provide rotary movement to the sprinkler nozzle assembly and upwardly projecting nozzle housing and nozzle.

A lawn sprinkler apparatus 200 is provided for regulating the flow of water 240 and delivering water to lawn 20. The lawn sprinkler apparatus 200 includes a base 232 that is configured to confiningly receive a pressurized water flow of water 240, as noted in FIG. 18. A pop-up nozzle 300 is provided, fluidically coupled to the base 232. The pop-up nozzle 300 is configured to be driven by a drive mechanism 310 (see FIG. 17) for arcuate movement with respect to the base 232. In this embodiment, the pop-up nozzle 300 includes an outlet orifice 30 and a driven gear $G_{16}$. The pop up nozzle 300 is responsive to the pressurized flow of water 240, which acts against first water flow restrictor 282 to move the entire sprinkler nozzle assembly 302 (see FIG. 16) upward into an operating position for discharge of a water stream, indicated by reference arrow 304, from the outlet orifice 30.

The drive mechanism 310 is coupled to the pop-up nozzle 300. The drive mechanism 310 includes a gear train 262 and a water driven impeller 270 for operatively driving the sprinkler nozzle assembly 302, including pop-up nozzle 300, for arcuate movement with respect to base 232. As seem in more detail in FIGS. 17 and 18, impeller 270 may be mounted on shaft $S_{10}$, which in turn is situated for rotary movement in bushing $B_{10}$. Shaft $S_{10}$ turns gear $G_{10}$. The driven gear, $G_{11}$, turns shaft $S_{13}$ as an input to gear reducer $G_{R2}$. A reduced rotary speed shaft $S_{12}$ has gear $C_{15}$ mounted thereto, and gear $G_{15}$ drives $G_{16}$ on the pop-up nozzle 300. Also, gear $G_{15}$ drives gear $G_{14}$, which in turn, via shaft $S_{11}$, rotates $G_{13}$ to drive $G_{12}$, which rotates the second water flow restrictor 284.

As seen in FIG. 17, at the upper inner edge 320 of sprinkler nozzle assembly 302, a seal 322 is provided at or adjacent to a flange 323 on pop-up nozzle 300, to prevent leakage of water. In an embodiment, flange 323 may be generally L-shaped and sized and shaped to prevent ejection of pop-up nozzle 300 from sprinkler nozzle assembly 302. In this configuration, at the inner annular edge 324 of top 326 of base 232, a seal 328 is provided. Seals 322 and 328 may, in an embodiment be substantially in the shape and form of flexible O-rings of rubber and other suitable elastomer. Similarly, as seen in FIG. 17A, when a screw-on cap 47B is provided on lawn sprinkler apparatus 201, at the inner annular edge $\mathbf{324}_B$ of cap $\mathbf{47}_B$ a seal $\mathbf{328}_B$ is provided, which seal may be in the shape an form of flexible O-ring of rubber or other suitable elastomer.

Figure 18:
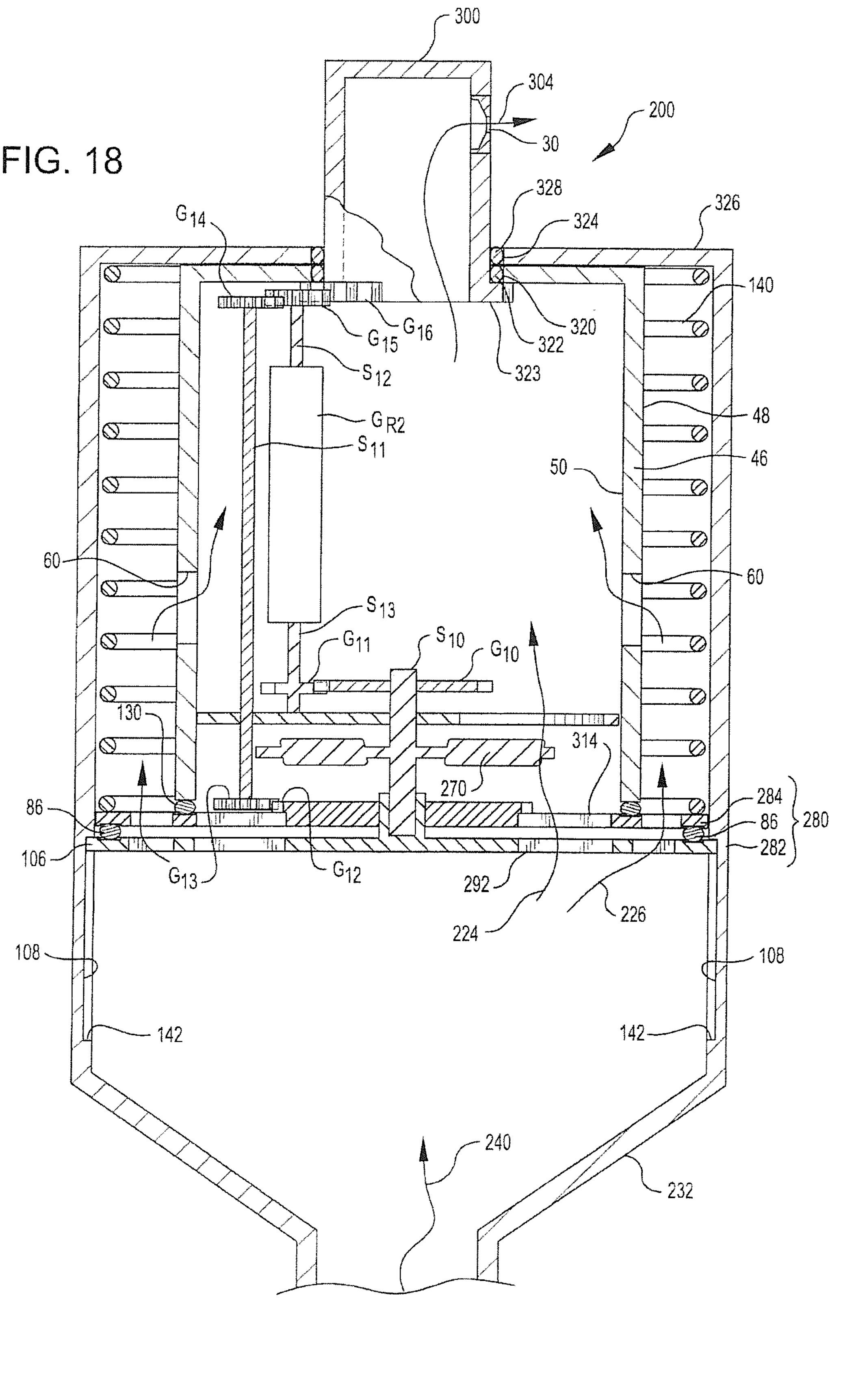
FIG. 18 is a vertical cross-sectional view of the embodiment just illustrated in FIGS. 14, 15, 16, and 17 above, but now showing the sprinkler nozzle assembly in an operating, pop-up position, with the nozzle housing rising above the top of the sprinkler base, so that the nozzle is exposed for projection of a water stream outward from the nozzle housing.

As shown in operation in FIG. 18, a water flow regulator 280 is provided. The water flow regulator 280 functions generally as described above with respect to water flow regulator 80. More specifically, water flow regulator 280 regulates a first portion 224 of water flow to increase water flow rate of the first portion 224 water flow over a first unit of time, and regulates the first portion 224 of water flow to decrease water flow rate of the first portion 224 of water flow over a second unit of time. Further, the water flow regulator 280 is configured for regulating a second portion 226 of water flow to decrease water flow rate of the second portion 226 of water flow over a first unit of time and to increase water flow rate of the second portion 226 of the water flow over a second unit of time.

The first water flow restrictor 282 is provided with at least a first inlet, here illustrated as inlet 292 in FIG. 18, which is fluidically coupled to the base 232. A first outlet, here shown as passageways 314 in second water flow restrictor 284, is fluidically coupled to the outlet orifice 30. The drive mechanism 262 is fluidically driven by the first portion 224 of water 240 acting against impeller 270, after passage of water through the water flow regulator 280.

The outlet orifice 30 is sized and shaped to (a) to decrease the radial length of water distribution along a first vector (e.g., $R_6$ as depicted in FIG. 1 above) over a first unit of time in response to a decrease in water flow rate of the second portion 226 of water flow, and (b) to increase the radial length of water distribution along a second vector (e.g., $R_8$ as depicted in FIG. 1 above) over a second unit of time in response to the increase in water flow rate of the second portion 226 of the water flow. The drive mechanism 310 is operative to increase the arcuate speed of the sprinkler nozzle assembly 300 over the first unit of time in response to the increase in water flow rate of the first portion 224 of water flow, and to decrease the arcuate speed of the sprinkler nozzle assembly 302 over the second unit of time in response to a decrease in water flow rate of the first portion 224 of the water flow.

The water flow regulator 280 may be provided in one embodiment by a first water flow restrictor 282 and a second water flow restrictor 284 (similar to second flow restrictor 84 as described above, but including a driven gear $G_{12}$). The water flow regulator 280 includes an impeller regulator portion and a nozzle regulator portion. The impeller regulator portion may be provided by the juxtaposition of the passageways, or lack thereof, in inner portions of first water flow restrictor 282 and the second water flow restrictor 284. Further, the nozzle regulator portion may be provided by the juxtaposition of outer portions of the first water flow restrictor 282 and the second water flow restrictor 284. In this manner, during a first unit of time, the impeller regulator portion is configured to operatively increase flow of first portion 224 of water that is acting on impeller 270, and the nozzle regulator portion is configured to operatively decrease fluid flow through the outlet orifice 30. Likewise, during a second unit of time, the impeller regulator portion is configured to operatively decrease the fluid flow through the impeller 270 (and thus decrease arcuate speed of the nozzle assembly 300 and thus of the nozzle 30), while the nozzle regulator portion is configured to operatively increase fluid flow through the nozzle 30. Thus, it can be understood that the pop-up nozzle 300 (and the outlet orifice 30) is driven in arcuate movement through the drive mechanism 310, including gear train 262, as powered via the turbine or impeller 270. The water flow regulator 280 includes the impeller regulator portion that is shaped and sized to regulate the flow of water flow through the impeller 270. The nozzle regulator portion is sized and shaped to regulate at least a portion of the flow of water to the outlet orifice 30. During a first period of time (1) the shape and size of the impeller regulator portion is configured so that the impeller regulator portion operatively increases water flow through the impeller 270, and (2) the shape and size of the nozzle regulator portion is configured so that the nozzle regulator portion decreases water flow to the outlet orifice 30. During a second period of time, (1) the shape and size of the impeller regulator portion is configured so that the impeller regulator portion operatively decreases water flow through the impeller 270, and (2) the shape and size of the nozzle regulator portion is configured so that the nozzle regulator portion operatively increases water flow to the outlet orifice 30.

In one embodiment, the flow regulator portion includes, an impeller regulator portion made up, at least in part, of an inner portion of a first water flow restrictor 282 provided in the form of a first perforated disk, and wherein the inner portion of the first water flow restrictor 282 has apertures therethrough defined by the first flow restrictor inner aperture sidewalls. Further, such an impeller regulator portion may also be made up by portions of a second water flow restrictor 284, provided in the form of a perforated disk, and wherein the inner portion of the second water flow restrictor 284 has apertures therethrough defined by second flow restrictor inner aperture sidewalls. The various features and structures mentioned in this paragraph may be provided as described with respect to the features and structures described in relation to FIGS. 4, 5, and 6 as noted above, and need not be further detailed to enable those of skill in the art, and to whom this disclosure is directed, to make and use such a device.

Similarly, the water flow regulator 280 may include a nozzle regulator portion that uses a first water flow restrictor 282 in the form of a perforated disc which includes an outer portion having apertures 92 therethrough defined by first perforated disk outer aperture sidewalls. In such a configuration, the nozzle regulator portion may also use a second water flow restrictor 284 in the form of a perforated disc which includes an outer portion having an outer apertures 120 defined by second perforated disk outer aperture sidewalls.

The water flow regulator 280 may be provided in a configuration wherein the second water flow restrictor 284 is located and configured for relative movement with respect to the first water flow restrictor 282, so that the inner portion apertures 92 of the first flow restrictor 80 and the inner portion apertures 114 of the second water flow restrictor 284 cooperatively provide the increasing and decreasing flow of the first portion 224 of water flow during movement of the second water flow restrictor 284 relative to the first water flow restrictor 282, to provide an impeller 270 regulator portion.

Likewise, the water flow regulator 280 may be provided with a nozzle regulator portion provided via the relative movement of the second water flow restrictor 284 outer apertures 120 with respect to the first water flow restrictor 282 outer apertures 98, for cooperatively providing the increasing and decreasing water flow first fluid flow during movement of the second water flow restrictor 284 relative to the first water flow restrictor 282.

When the first 282 and second 284 water flow restrictors are designed for relatively movement in an arcuate fashion, as herein described, it may be convenient to provide the first 282 and second 284 water flow restrictors each in the form of a substantially circular disk with perforations therethrough.

Using an apparatus as described herein, a useful method for watering a lawn (or other area) is provided. An increasing volume of water may be distributed along a first radial of first radial length via a rotating sprinkler nozzle assembly, while decreasing arcuate speed of the sprinkler nozzle assembly over a first unit of time. Then, a decreasing volume of water may be distributed along a second radial of second radial length via a rotating sprinkler nozzle assembly while increasing arcuate speed of the sprinkler nozzle assembly over a second unit of time. In the method, a sprinkler of the type described herein above is provided. The sprinkler is provided in a "pop-up" configuration. A drive mechanism drives a sprinkler nozzle assembly. The nozzle assembly provides variable direction of a water outlet nozzle. The sprinkler nozzle assembly is driven by a drive mechanism that regulates a first portion of water flow with a water flow regulator to increase water flow rate of the first portion of said water flow over a first unit of time, and to decrease water flow rate of a first portion of water flow over a second unit of time. The water flow regulator has a first inlet fluidically coupled to a base and a first outlet fluidically coupled to the nozzle. A second portion of water flow is regulated by the water flow regulator to decrease water flow rate of the second portion of the water flow over a first unit of time and to increase water flow rate of the second portion of the water flow over a second unit of time. The water flow regulator may also include an outlet fluidically coupled to the drive mechanism, in that the drive mechanism is driven by the first portion of the water flow. The nozzle configuration is such that the nozzle decreases radial length of water distribution along a first vector from an axis of rotation over a first unit of time in response to a decrease in water flow rate of a second portion of water flow, and increases radial length of water distribution along a second vector from the axis over a second unit of time in response to an increase in water flow rate of a second portion of said water flow. The drive mechanism decreases the arcuate speed of a sprinkler nozzle assembly over a second unit of time in response to a decrease in water flow rate of a first portion of water flow, and increases arcuate speed of the sprinkler nozzle assembly over a first unit of time in response to an increase in water flow rate of the first portion of the water flow. Generally, the description as set forth in this paragraph is analogous to the description noted above with respect to the lawn 20, angles, and radials set forth in FIG. 1.

It is to be appreciated that the various aspects, features, structures, and embodiments of a lawn sprinkler with flow regulator for substantially uniform delivery of water on a volume per square foot of lawn as described herein is a significant improvement in the state of the art. The lawn sprinkler design is simple, reliable, and easy to use. Although only a few exemplary aspects and embodiments have been described in detail, various details are sufficiently set forth in the drawing figures and in the specification provided herein to enable one of ordinary skill in the art to make and use the invention(s), which need not be further described by additional writing.

Importantly, the aspects, features, structures, and embodiments described and claimed herein may be modified from those shown without materially departing from the novel teachings and advantages provided, and may be embodied in other specific forms without departing from the spirit or essential characteristics thereof. Therefore, the various aspects and embodiments presented herein are to be considered in all respects as illustrative and not restrictive. As such, this disclosure is intended to cover the structures described herein and not only structural equivalents thereof, but also equivalent structures. Numerous modifications and variations are possible in light of the above teachings. The scope of the invention, as described herein is thus intended to include variations from the various aspects and embodiments provided which are nevertheless described by the broad meaning and range properly afforded to the language herein, as explained by and in light of the terms included herein, or the legal equivalents thereof.

The invention claimed is:

1. A flow regulator for use with a sprinkler nozzle assembly, said sprinkler nozzle assembly comprising a nozzle, an impeller, and a transmission, said nozzle driven in arcuate movement by said impeller through said transmission, said flow regulator comprising:

(a) an impeller regulator portion, said impeller regulator portion shaped and sized to regulate the flow of water flow through said impeller;

(b) a nozzle regulator portion, said nozzle regulator portion shaped and sized to regulate at least a portion of the flow of water to said nozzle;

(c) wherein during a first period of time, (1) the shape and size of the impeller regulator portion is configured so that said impeller regulator portion operatively increases water flow through said impeller, and (2) the shape and size of the nozzle regulator portion is configured so that said nozzle regulator portion decreases water flow to said nozzle; and (d) wherein during a second period of time, (1) the shape and size of the impeller regulator portion is configured so that said impeller regulator portion operatively decreases water flow through said impeller, and (2) the shape and size of the nozzle regulator is configured so that said nozzle regulator portion operatively increases water flow to said nozzle.

2. The flow regulator as set forth in claim 1, wherein said impeller regulator portion comprises an inner portion of a first perforated disk, said inner portion having apertures therethrough defined by first perforated disk inner aperture sidewalls.

3. The flow regulator as set forth in claim 2, wherein said impeller regulator portion further comprises an inner portion of a second perforated disk, said inner portion having apertures therethrough defined by second perforated disk inner aperture sidewalls.

4. The flow regulator as set forth in claim 3, wherein said nozzle regulator portion comprises an outer portion of said first perforated disc, said outer portion having apertures therethrough defined by first perforated disk outer aperture sidewalls.

5. The flow regulator as set forth in claim 4, wherein said nozzle regulator portion comprises an outer portion of said second perforated disc, said outer portion having apertures therethrough defined by second perforated disk outer aperture sidewalls.

6. The flow regulator of claim 5, wherein said second perforated disk is located and configured for relative movement with respect to said first perforated disk so that said first perforated disk inner portion apertures and said second perforated disk inner portion apertures cooperatively provide the increasing and decreasing water flow first fluid flow during movement of said second perforated disk relative to and said first perforated disk, to provide said impeller regulator portion.

7. The flow regulator of claim 6, wherein said second perforated disk is located and configured for relative movement with respect to said first perforated disk so that said first perforated disk outer portion apertures and said second perforated disk outer portion apertures cooperatively provide the increasing and decreasing water flow first fluid flow during movement of said second perforated disk relative to said first perforated disk, to provide said nozzle regulator portion.

8. The flow regulator of claim 7, wherein said first perforated disk comprises a substantially circular disk with perforations therethrough.

9. The flow regulator of claim 7, wherein said second perforated disk comprises a substantially circular disk with perforations therethrough.

10. A method for watering a lawn, said method increasing volume of water distributed along a first radial of first radial length via a rotating sprinkler nozzle assembly while decreasing arcuate speed of said sprinkler nozzle assembly over a first unit of time, and decreasing volume of water distributed along a second radial of second radial length via a rotating sprinkler nozzle assembly while increasing arcuate speed of said sprinkler nozzle assembly over a second unit of time, said method comprising:

providing a base, said base configured to confiningly receive a pressurized water flow;

providing a sprinkler nozzle assembly, said sprinkler nozzle assembly configured for pop-up operation with respect to said base upon receipt of said pressurized water flow by said base, and arcuately driven with respect to said base, said sprinkler nozzle assembly comprising a sprinkler nozzle assembly housing and a nozzle;

providing a drive mechanism coupled to said sprinkler nozzle assembly;

arcuately driving said sprinkler nozzle assembly with said drive mechanism;

regulating a first portion of said water flow with a water flow regulator to increase water flow rate of said first portion of said water flow over said first unit of time, and to decrease water flow rate of said first portion of said water flow over said second unit of time, said water flow regulator comprising a first inlet fluidically coupled to said base and a first outlet fluidically coupled to said nozzle, said water flow regulator further comprising an outlet fluidically coupled to said drive mechanism, said drive mechanism fluidically driven by said first portion of said first flow;

regulating a second portion of said water flow with said water flow regulator to decrease water flow rate of said second portion of said water flow over said first unit of time and to increase water flow rate of said second portion of said water flow over said second unit of time;

wherein said nozzle decreases radial length of water distribution of along said first vector from said axis over said first unit of time in response to said decrease in water flow rate of said second portion of said water flow, and increases radial length of water distribution along said second vector from said axis over said second unit of time in response to said increase in water flow rate of said second portion of said water flow; and wherein said drive mechanism decreases said arcuate speed of said sprinkler nozzle assembly over said second unit of time in response to said decrease in water flow rate of said first portion of said water flow, and increases said arcuate speed of said sprinkler nozzle assembly over said first unit of time in response to said increase in water flow rate of said first portion of said water flow.

* * * * *

UNITED STATES PATENT AND TRADEMARK OFFICE

CERTIFICATE OF CORRECTION

PATENT NO. : 8,567,697 B2
APPLICATION NO. : 13/672240
DATED : October 29, 2013
INVENTOR(S) : Anthony J. Bredberg It is certified that error appears in the above-identified patent and that said Letters Patent is hereby corrected as shown below:

IN THE SPECIFICATION:

Column 2, line 2, after the word "nozzle", delete ";" and substitute therefore --.--.

Column 3, line 12, delete "disc" and substitute therefore --disk--.

Column 3, line 62, after the word "in Fig.", delete "3" and substitute therefore --2--.

Column 5, line 12, delete "illustrate" and substitute therefore --illustrated--.

Column 5, line 26, after the word "view", delete "if" and substitute therefore --of--.

Column 5, line 33, after the word "restrictor", insert --)--.

Column 5, line 48, after the word "now", delete "shown" and substitute therefore --showing--.

Column 7, line 66, after the words "sidewall 100", delete "," and substitute therefore --.--.

Column 12, line 27, after the word "has gear", delete "$C_{15}$" and substitute therefore --$G_{15}$--.

Column 12, line 41, after the word "cap", delete "47B" and substitute therefore --$47_B$--.

Column 14, line 11, after the word "perforated", delete "disc" and substitute therefore --disk--.

Column 14, line 15, after the word "perforated", delete "disc" and substitute therefore --disk--.

IN THE CLAIMS:

Column 16, line 21, after the word "perforated", delete "disc" and substitute therefore --disk--.

Column 16, line 26, after the word "perforated", delete "disc" and substitute therefore --disk--.

Signed and Sealed this
Twenty-second Day of April, 2014

Michelle K. Lee

Michelle K. Lee
*Deputy Director of the United States Patent and Trademark Office*